United States Patent [19]

Takahashi et al.

[11] Patent Number: 5,270,631
[45] Date of Patent: Dec. 14, 1993

[54] LINEAR DC MOTOR DRIVING DEVICE

[75] Inventors: Hajime Takahashi; Mitsuhiko Saito; Yoshihiro Shimada, all of Tokyo, Japan

[73] Assignee: Olympus Optical Co., Ltd., Tokyo, Japan

[21] Appl. No.: 866,750

[22] Filed: Apr. 10, 1992

[30] Foreign Application Priority Data

| Apr. 16, 1991 | [JP] | Japan | 3-84040 |
| Apr. 25, 1991 | [JP] | Japan | 3-121884 |
| Apr. 26, 1991 | [JP] | Japan | 3-97543 |
| Aug. 7, 1991 | [JP] | Japan | 3-197875 |

[51] Int. Cl.$^5$ .................. H02K 41/00; H02P 1/00
[52] U.S. Cl. .................. 318/135; 318/640
[58] Field of Search ............... 318/135, 640

[56] References Cited

U.S. PATENT DOCUMENTS

| 4,624,537 | 11/1986 | Hanssen et al. | |
| 4,667,139 | 5/1987 | Hirai et al. | |
| 4,789,815 | 12/1988 | Kobayashi et al. | 318/135 |
| 4,833,382 | 5/1989 | Gibbs | |
| 4,839,543 | 6/1989 | Beakley et al. | 318/135 X |
| 4,916,340 | 4/1990 | Negishi | |
| 5,047,676 | 9/1991 | Ichikawa | 318/135 X |
| 5,066,897 | 11/1991 | Ueda et al. | 318/135 X |
| 5,075,583 | 12/1991 | Sakagami et al. | 318/135 X |
| 5,091,665 | 2/1992 | Kelly | 318/135 X |

FOREIGN PATENT DOCUMENTS 0063497 10/1982 European Pat. Off. .

OTHER PUBLICATIONS

Patent Abstracts of Japan, vol. 14, No. 444 (E-982) Sep. 21, 1990 & JP-A-21 74 547 (Matsushita Electric Works Ltd.).
Patent Abstracts of Japan, vol. 11, No. 249 (E-532) Aug. 13, 1987 & JP-A-62 060 491 (Aichi Emason Denki KK).
Patent Abstracts of Japan, vol. 011, No. 191 (M-600) Jun. 19, 1987 & JP-A-62 016 159 (Fujitsu Ltd.).

*Primary Examiner*—William M. Shoop, Jr.
*Assistant Examiner*—Karen Masih
*Attorney, Agent, or Firm*—Frishauf, Holtz, Goodman & Woodward

[57] ABSTRACT

A driving device for a multipolar type linear DC motor using a PWM (pulse width modulation) driving signal for driving a linear DC motor by causing an excitation coil of the motor, placed in alternating fields, to generate an induction field, and switching polarities of the induction field. The device includes a magnet polarity detecting circuit for detecting a direction of a magnetic field acting on the excitation coil in the alternating fields, an electric filter for removing an output signal output from the magnet polarity detecting circuit and having the same period as a PWM drive period, and polarity switching control circuit for controlling a direction and generation time of an induction field generated by the excitation coil in accordance with an output signal from the magnet polarity detecting circuit.

14 Claims, 27 Drawing Sheets

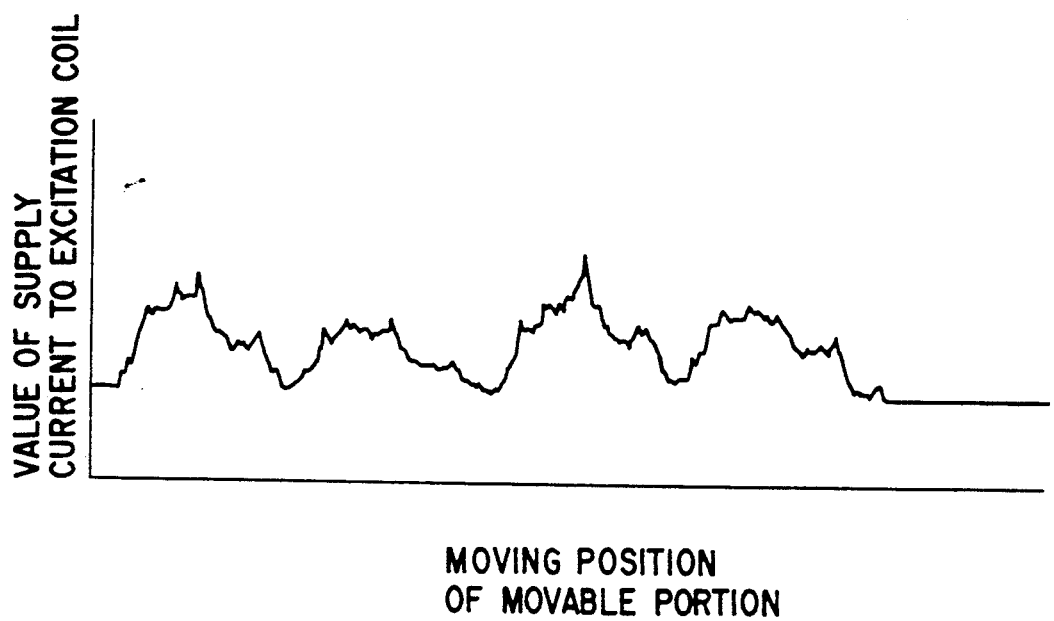
F I G. 6 ts ≫ tp
ENCODER PULSE

ENCODER PULSE
IN VERY LOW-SPEED RANGE

NORMAL SAMPLING TIME

SAMPLING TIME
IN VERY LOW-SPEED RANGE

NORMAL SPEED RANGE
(DIFFERENTIAL CYCLE: 300μs)

VERY LOW-SPEED RANGE
(DIFFERENTIAL CYCLE: 300μs)

VERY LOW-SPEED RANGE
(DIFFERENTIAL CYCLE: 3ms)

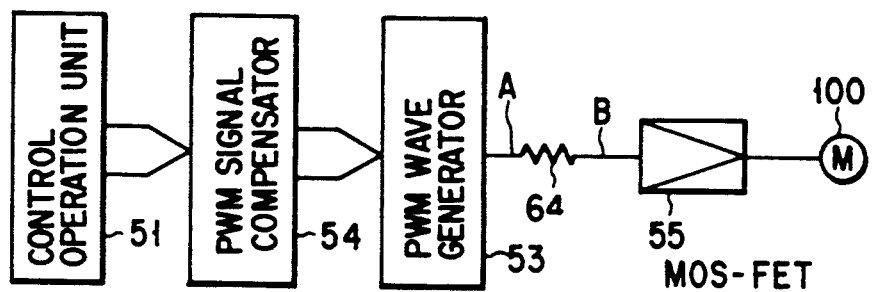
F I G. 16
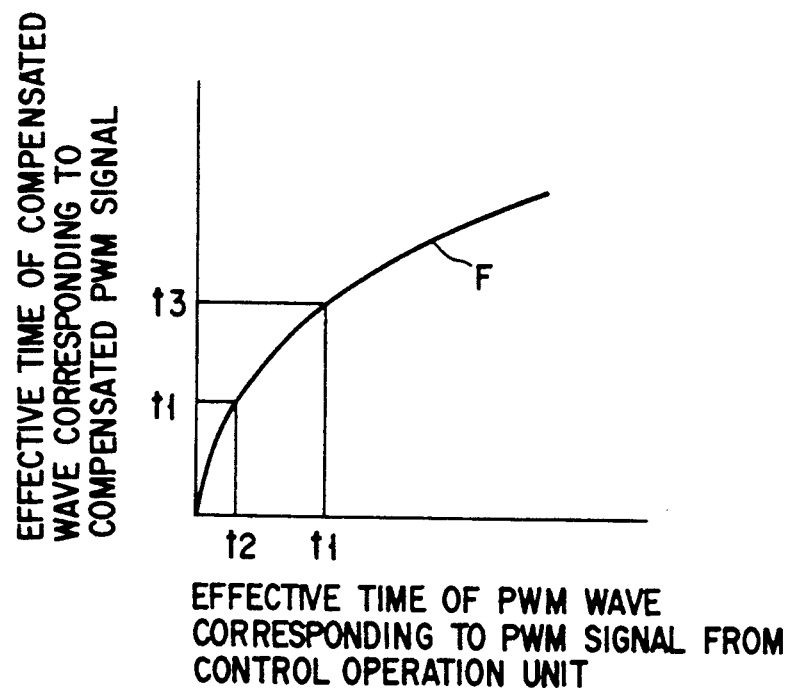
EFFECTIVE TIME OF PWM WAVE
CORRESPONDING TO PWM SIGNAL FROM
CONTROL OPERATION UNIT
F I G. 17

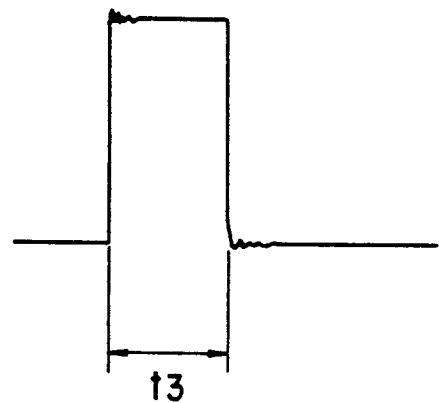
F I G. 21A
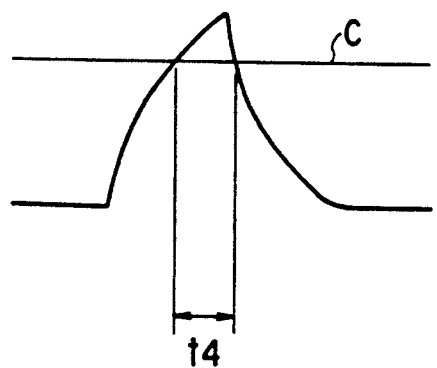
F I G. 21B

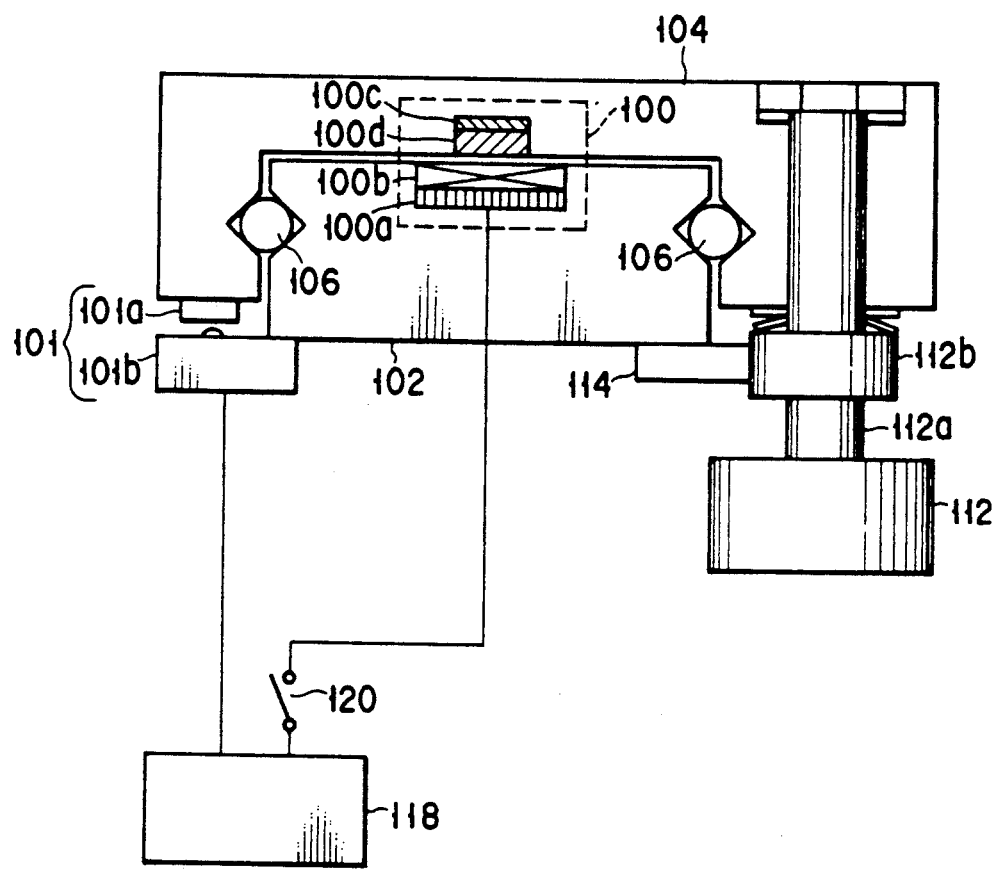
F I G. 22

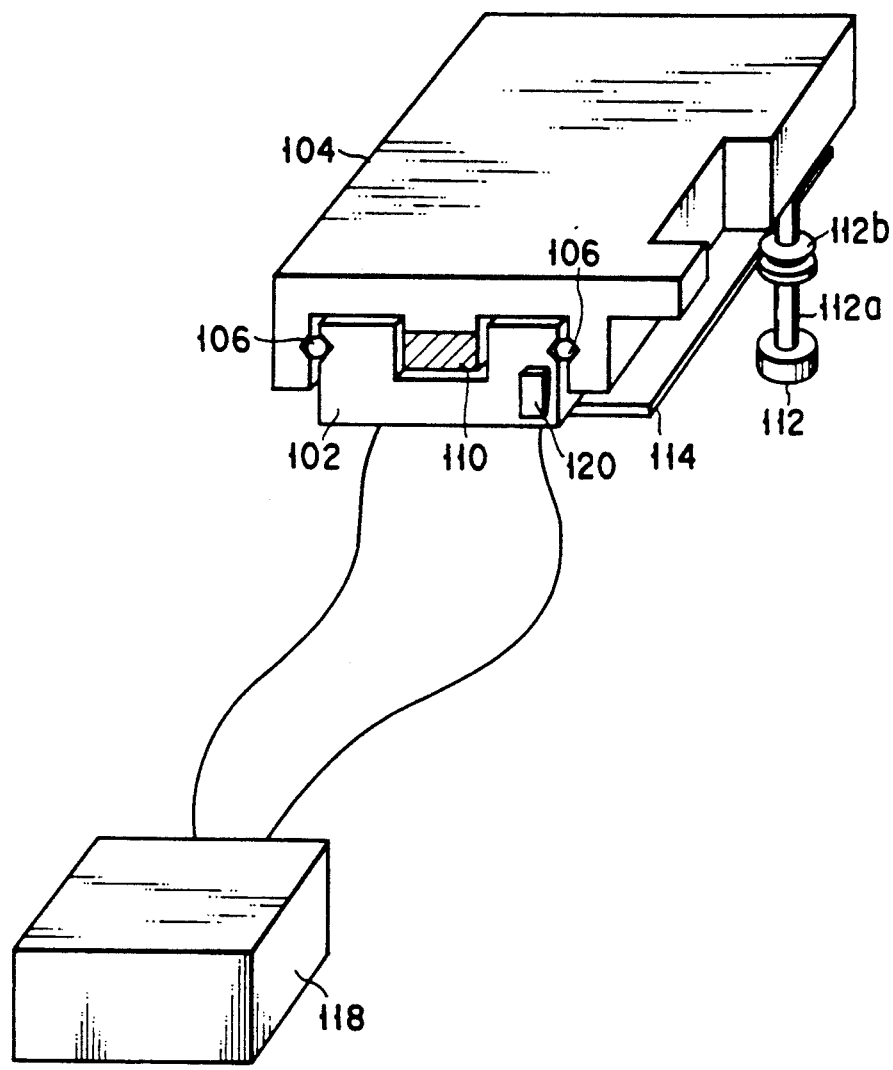
F I G. 23

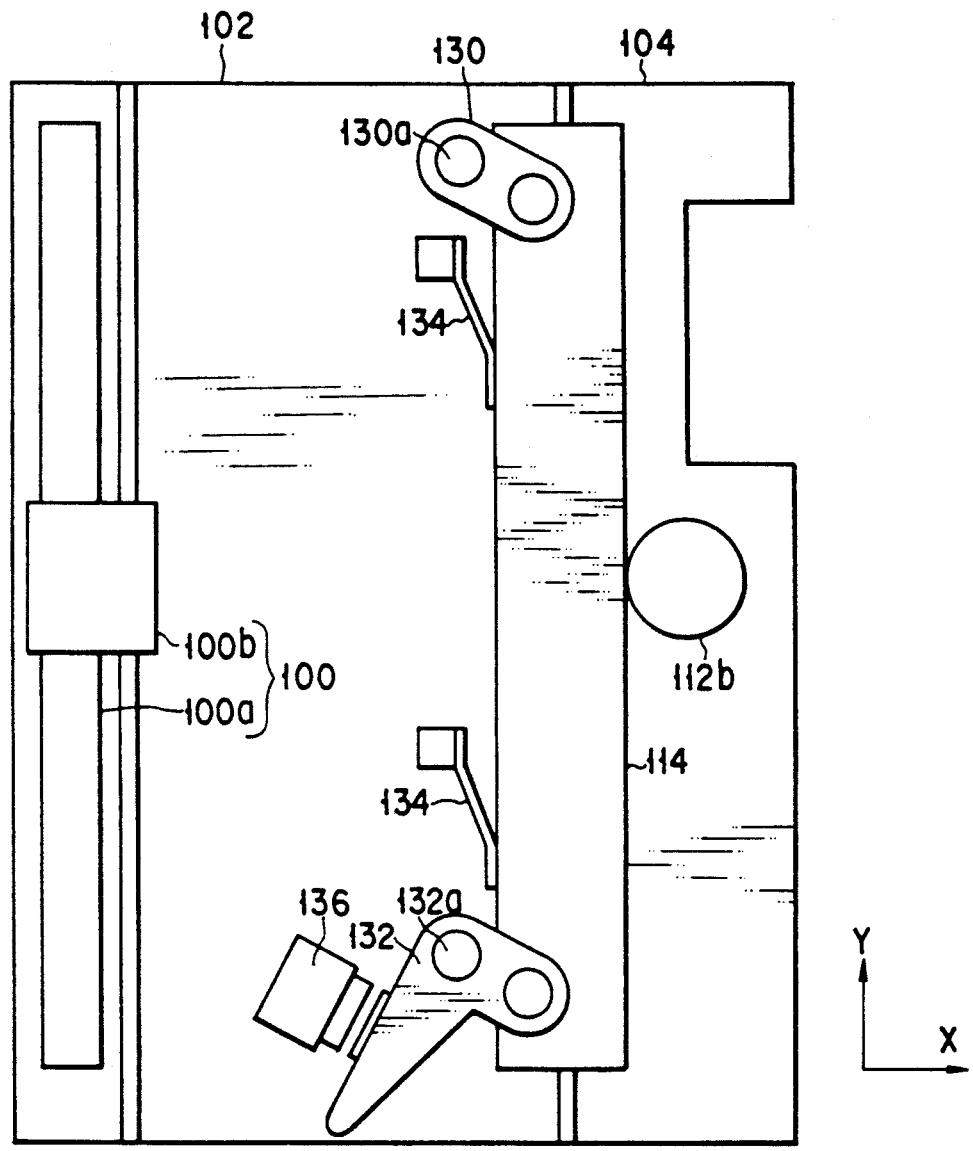
F I G. 25

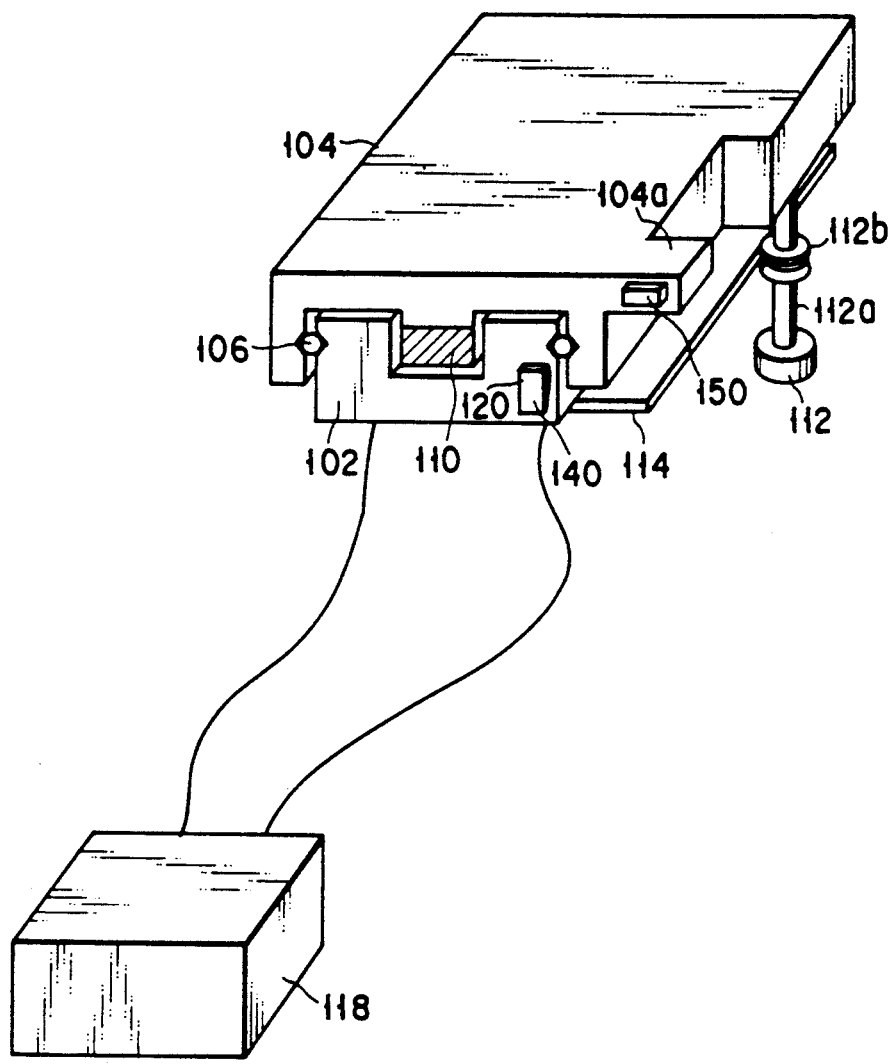
F I G. 27

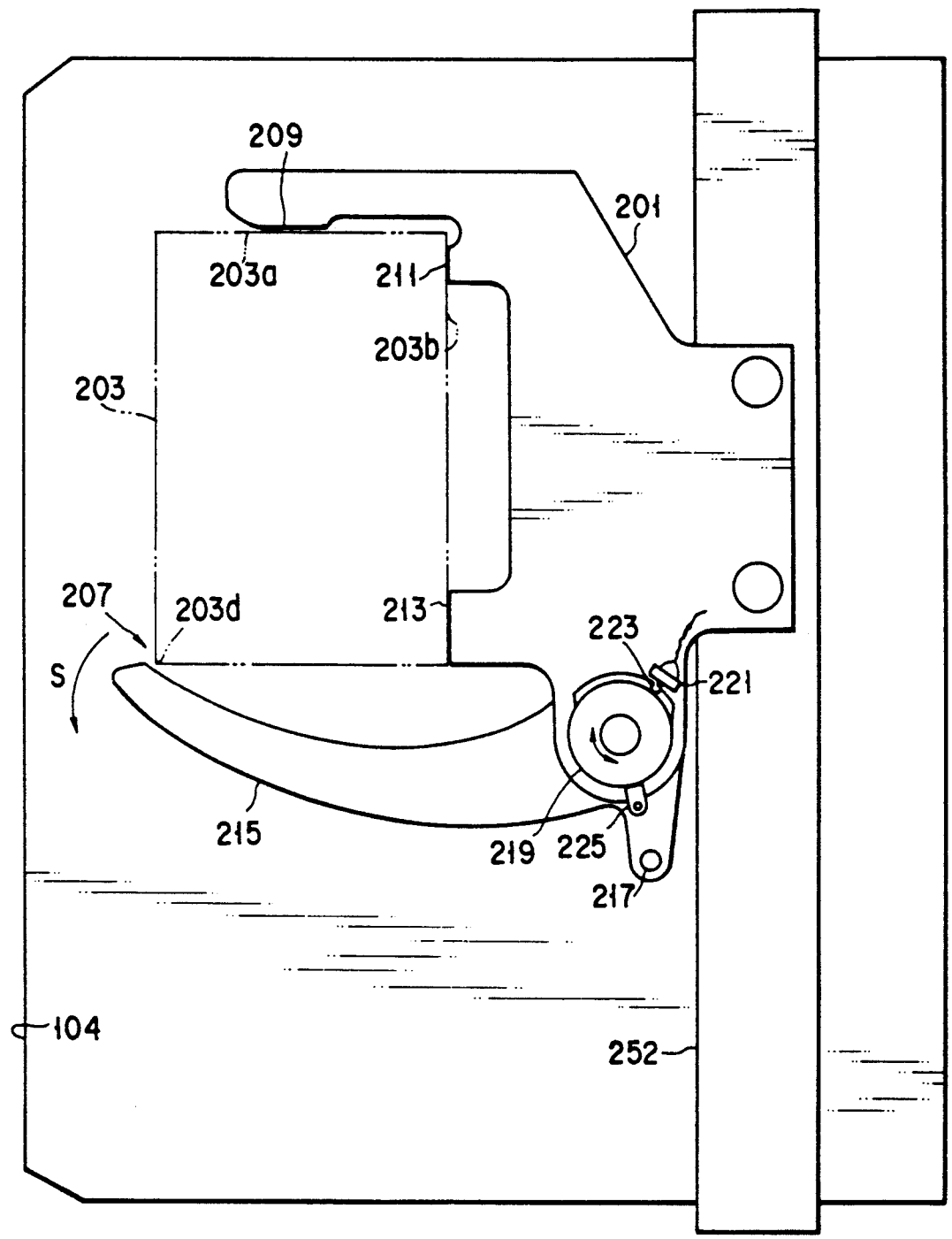
F I G. 28

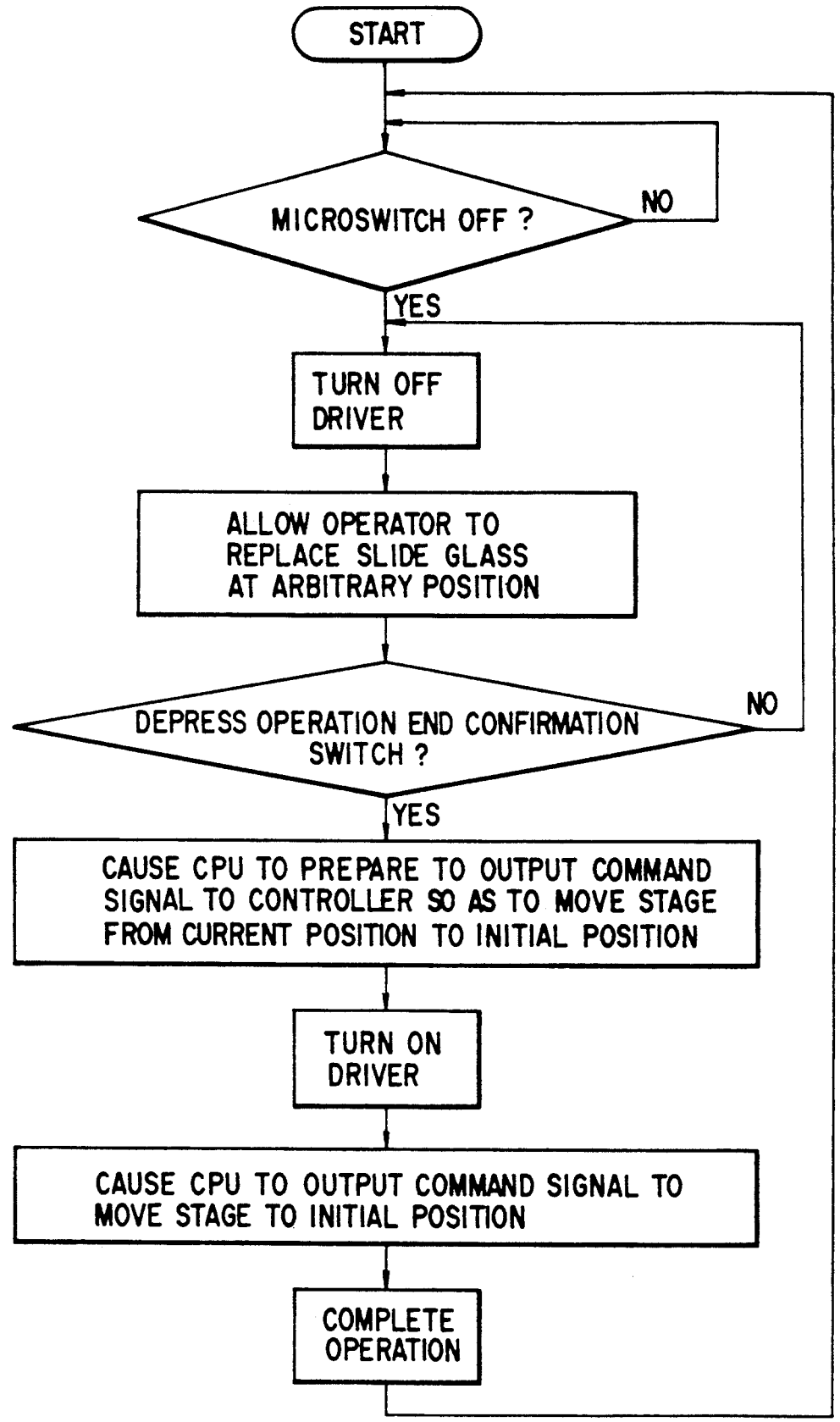
F I G. 32

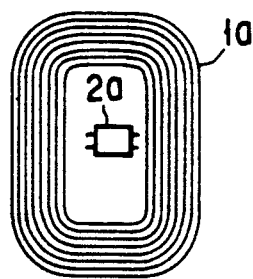
F I G. 34

LINEAR DC MOTOR DRIVING DEVICE

BACKGROUND OF THE INVENTION

1. Field of the Invention

The present invention relates to a driving device for a linear DC motor used, for example, to move a movable stage of a microscope or the like.

2. Description of the Related Art

Linear motors have widely been used as linear movement driving devices for X-Y stages and the like. Especially a multipolar type linear DC motor using a PWM (pulse width modulation) driving scheme has been increasingly used as a small, efficient driving device which can produce a large thrust yet consumes small power.

As shown in FIG. 33, such a motor is constituted by U-, V-, and W-phase excitation coils $1a$, $1b$, and $1c$, and Hall elements $2a$, $2b$, and $2c$ for respectively detecting the directions of magnetic fields acting on the respective coils. A driving device for this motor includes a speed controller constituted by comparators $4a$, $4b$, and $4c$ for comparing the potentials at the output terminals of the Hall elements of the respective phases to output signals representing the directions of alternating fields acting on the excitation coils of the respective phases, and a polarity switching controller 6 for controlling the directions and supply times of currents to be respectively supplied to PWM amplifiers $5a$, $5b$, and $5c$, designed to supply excitation currents to the excitation coils of the respective phases, in accordance with the output signals from the comparators $4a$, $4b$, and $4c$.

In this arrangement, for example, the Hall elements $2a$, $2b$, and $2c$ are respectively arranged at the surfaces or near outer peripheries of the excitation coils to reliably detect magnetic fields in alternating fields. However, when the device is to be reduced in size, it is most desirable that each Hall element be located in the center of a corresponding excitation coil, as shown in FIG. 34, in consideration of the influence of heat, radiated from the excitation coil, on the Hall element, detection precision with a decrease in magnetic flux density at the Hall element separated from the excitation coil, and the like.

However, in the conventional device in which each Hall element is arranged in the center of a corresponding excitation coil, when the motor is driven, each Hall element may be erroneously operated. More specifically, as shown in FIG. 35A, a Hall element 2 is arranged at a central portion of an excitation coil 8, and alternating fields are generated by magnets $10a$, $10b$, and $10c$ mounted on a magnet side yoke 9 such that their magnetic poles alternate and the directions of the magnetic poles of the adjacent magnets differ from each other. In such alternating fields, if, for example, the Hall element 2 is located to oppose a central portion of the magnet $10b$, the magnetic field (solid arrows) of the magnet $10b$ can be reliably detected. If, however, the Hall element 2 is located at a position where the magnetic poles of magnets are switched, e.g., a position to oppose the boundary between the magnets $10b$ and $10c$, as shown in FIG. 35B, since the magnetic flux density of alternating fields is considerably decreased, the magnetic fields of the magnets $10b$ and $10c$ cannot be detected, but an induction field (broken arrows) generated by the excitation coil 1 is detected. In such a state, an error is caused in the current supply timing of the polarity switching controller 6 for switching the direction of a current to be supplied to an excitation coil 1 in accordance with a detection signal from the Hall element 2. If the direction of the supply current to the excitation coil 1 is switched in accordance with a detection signal from the Hall element 2 which is erroneously operated, the operation error of the Hall element 2 is repeated. As a result, the direction of the supply current to the excitation coil is switched in synchronism with a period corresponding to the PWM drive frequency, and an excitation current supply control system for the polarity switching controller 6 is oscillated, thus causing a decrease in thrust constant, i.e., output thrust with respect to the supply current to the excitation coil, and heating the excitation coil. FIG. 36 shows the relationship between the moving position of a movable portion and the value of a supply current to an excitation coil, obtained when such a conventional device is driven at a constant low speed. As is apparent from FIG. 36, peak currents are generated at positions where polarities in alternating fields are switched. The thrust constant is decreased at these positions. Such a thrust decrease due a peak current is especially conspicuous or poses a problem when the motor is driven in a low-speed range. For this reason, this conventional device cannot be suitably used to move the stage of a microscope or the like.

SUMMARY OF THE INVENTION

It is an object of the present invention to provide a driving device which can drive a linear DC motor with stable output characteristics while eliminating the influence of the induction field of each excitation coil on the control system of a polarity switching controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing the relationship between the moving position of a movable portion and the value of a current supplied to an excitation coil in a state wherein the motor is driven by the device shown in FIG. 4;

FIG. 16 is a block diagram showing a more detailed arrangement of the circuit shown in FIG. 15;

FIG. 17 is a graph showing the relationship between the effective time of a PWM wave and that of a compensated PWM wave;

FIGS. 21A and 21B are graphs respectively showing a PWM waveform with a large pulse width and a gate drive pulse corresponding to the PWM waveform, similar to FIGS. 20A and 20B;

FIG. 22 is a front view showing a linear motor type scanning stage;

FIG. 23 is a perspective view showing the scanning stage in FIG. 22;

FIG. 25 is a bottom view showing the scanning stage in FIG. 24;

FIG. 27 is a perspective view showing still another linear motor type scanning stage;

FIG. 28 is an enlarged plan view showing the arrangement of a microscope stage with a specimen holder;

FIG. 32 is a flow chart showing an operation of the specimen holder shown in FIG. 28;

FIG. 34 is a view showing a state wherein a Hall element is arranged in the center of an excitation coil;

DETAILED DESCRIPTION OF THE PREFERRED EMBODIMENTS

A driving device for a linear DC motor according to an embodiment of the present invention, which is applied to a driving device for driving the movable stage of a microscope, will be described below with reference to the accompanying drawings.

Figure 1:
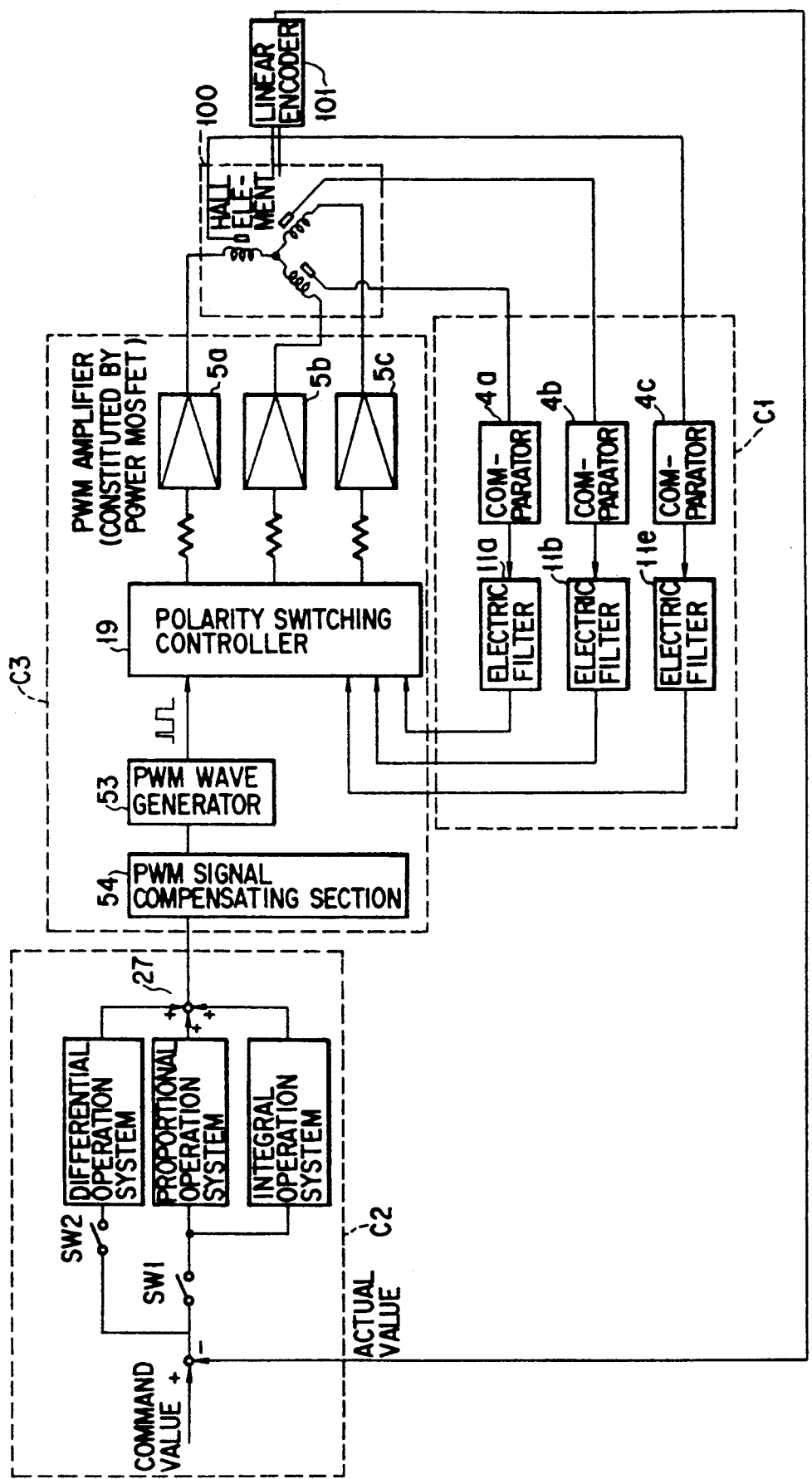
FIG. 1 is a schematic circuit diagram showing the overall arrangement of a driving device for a linear DC motor according to the present invention.

FIG. 1 schematically shows the overall device. Reference numerals 100 and 101 respectively denote a linear DC motor and a linear encoder, both arranged between stationary and movable stages (to be described later). The linear DC motor 100 is designed to move the movable stage with respect to the stationary stage. The linear encoder 101 serves to detect the speed or moving distance of the movable stage. A speed controller C1 for driving the motor 100 by switching the polarities of magnetic fields in the motor 100 is connected to the output terminal of a Hall element (to be described later). A position controller C2 for controlling the position of the movable stage is connected to the output terminal of the linear encoder 101. A driving controller C3 is connected to the output terminals of the first and second controllers C1 and C2. The driving controller C3 serves to drive the linear motor 100 while performing position control and speed control for the movable stage in accordance with output signals from the controllers C1 and C2.

The above-mentioned circuits C1 to C3 will be described below by using the same reference numerals to denote the same parts as in the conventional device.

Figure 2:
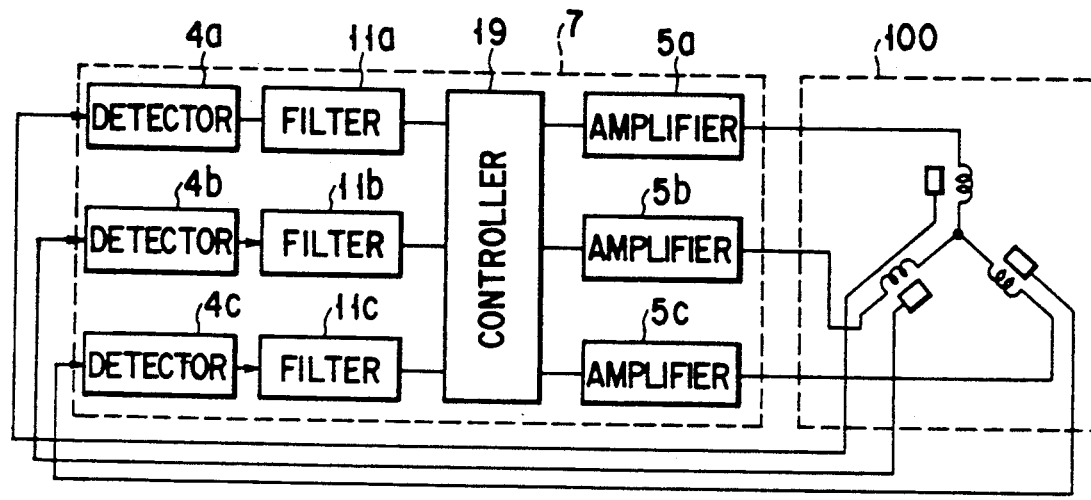
FIG. 2 is a schematic block diagram showing the arrangement of part of the driving device.

As shown in FIG. 2, a controller including the speed controller C1 and the driving controller C3 comprises a magnet polarity detecting means or detectors (comparators) 4a, 4b, and 4c for detecting the directions of magnetic fields in alternating fields acting on excitation coils, electric filters 11a, 11b, and 11c for removing output signals, from the magnet polarity detecting means, which have the same period as the PWM drive period, and a polarity switching means (controller) 19 for controlling the directions and generation times of induction fields to be generated in the excitation coils in accordance with output signals from the magnet polarity detecting means.

Figure 4:
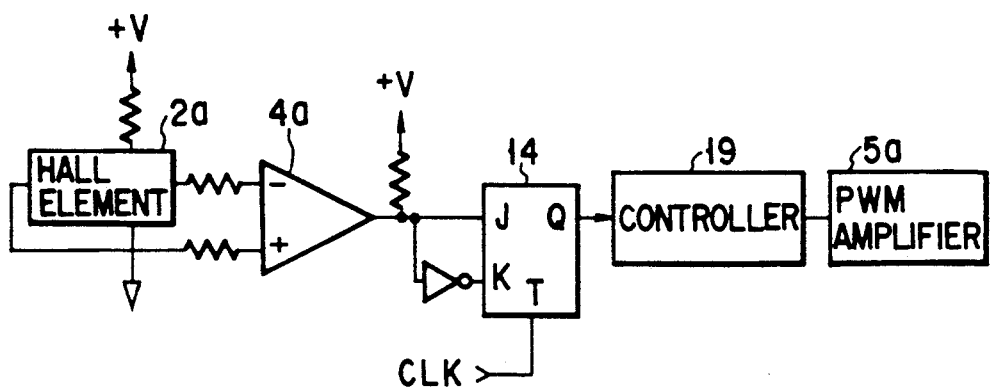
FIG. 4 is a circuit diagram showing the detailed arrangement of a circuit portion of the device shown in FIG. 2.

FIG. 4 shows a U-phase controller portion in the above-described controller. Reference numeral 2a denotes a Hall element for detecting a magnetic field in alternating fields acting on a U-phase excitation coil arranged on a movable portion; 4a, a comparator having an open collector output and designed to compare the potential difference between the output terminals of the Hall element 2a with a reference potential so as to detect the direction of the magnetic field; 14, a J-K flip-flop circuit serving as an electric filter for receiving a clock signal (to be referred to as a CLK hereinafter) having the same period as that corresponding to a PWM drive frequency and latching/outputting the state of an output signal from the comparator 4a to an output terminal Q at the trailing edge of the CLK; 5a, a PWM amplifier for amplifying an excitation current to the corresponding excitation coil; and 19, a polarity switching controller for selecting a coil to be excited and controlling the direction and time of the supply current in accordance with an output signal from the J-K flip-flop circuit 14, thus outputting a current to the PWM amplifier 5a. Note that the Hall element 2a on the movable portion of the motor is arranged in the center of the excitation coil, as shown in FIG. 34. Each of the V- and W-phase control sections (not shown) has the same arrangement as that shown in FIG. 4.

Figure 5A:
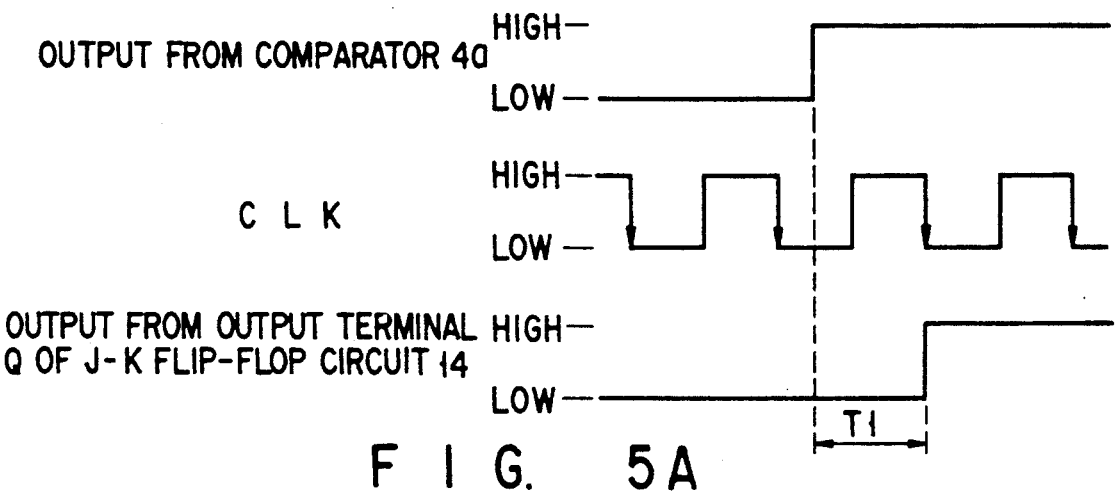
FIG. 5A is a timing chart of the device shown in FIG. 4 in a state wherein the motor is driven.
Figure 5B:
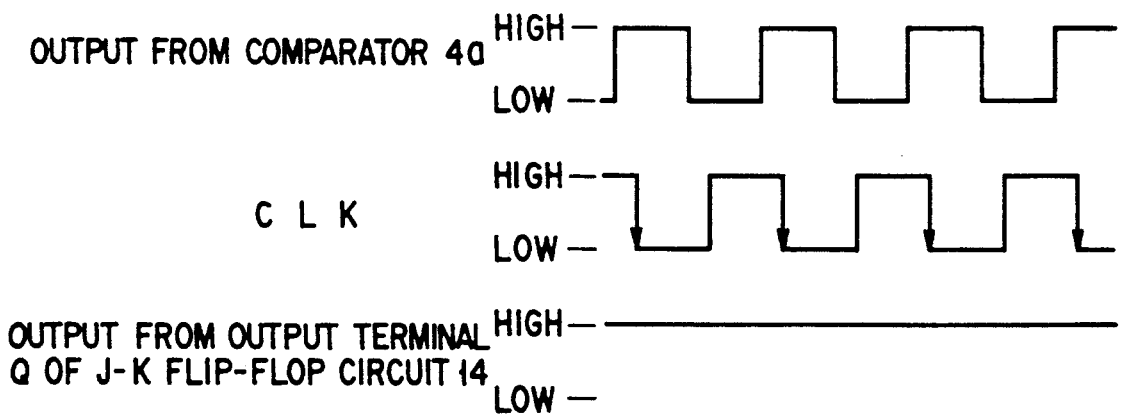
FIG. 5B is a timing chart of the device shown in FIG. 4 in a state wherein an excitation coil is stopped at a position where polarities in alternating fields are switched.

In the device having the arrangement shown in FIG. 4, when the motor is driven, an output signal from the comparator 4a goes from Low level to High level, as shown in FIG. 5A, as the polarity detected by the Hall element 2a changes from the N pole to the S pole or from the S pole to the N pole. At the trailing edge of the CLK, the output terminal Q of the J-K flip-flip circuit 14 goes from Low level to High level, and the resultant signal is supplied to the polarity switching controller 19. The polarity switching controller 19 outputs a current to the PWM amplifier 5a while selecting a coil to be excited and controlling the direction and time of the supply current in accordance with the output state of the J-K flip-flop circuit 14, i.e., the polarity of a magnetic field acting on the excitation coil. In this case, the output from the J-K flip-flop circuit 14 is delayed from the output signal from the comparator 4a by a time period T1. However, this delay is equivalent to one period defining the PWM drive frequency at most, and hence no problem is posed in control of the polarity switching controller 19. Since a latch/output operation of the J-K flip-flop circuit 14 is always performed at the trailing edge of the CLK, the output level of the J-K flip-flop circuit 14, i.e., the polarity of a magnetic field acting on the excitation coil, is not changed faster than the CLK period. Therefore, a control system for the polarity switching controller 19 is not oscillated by an erroneous operation of the Hall element 2a, and a control operation can be performed with stable output characteristics. When the excitation coil is stopped at a position where the polarities of magnets in alternating fields are switched, the Hall element 2a does not detect magnetic fields in the alternating fields but detects an induction field generated by the excitation coil. For this reason, as shown in FIG. 5B, the output signal from the comparator 4a is changed at a period at which the PWM amplifier 5a supplies a current to the excitation coil, i.e., the period of the CLK. However, since the period of change in output signal from the comparator 4a coincides with the latching timing of the J-K flip-flop circuit 14, the output from the output terminal Q of the J-K flip-flop circuit 14 is kept at a constant level, i.e., High or Low level, and an erroneous operation of the Hall element 2a and the induction field generated by the excitation coil do not influence the control system for the polarity switching controller 19. FIG. 6 shows the relationship between the moving position of the movable portion and the value of a current supplied to the excitation coil when the motor is driven by the control device described above. As is apparent from FIG. 6, even if the excitation coil is located at a position where the polarities in the alternating fields are switched, no peak current is produced in the current supplied to the excitation coil, thus obtaining stable output characteristics.

Figure 7:
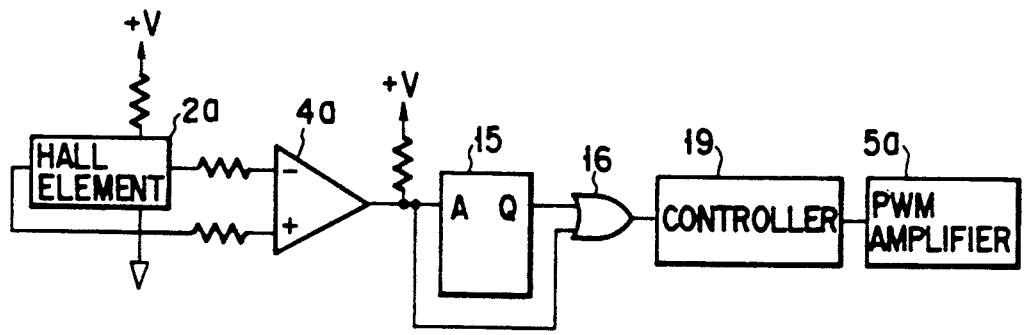
FIG. 7 is a circuit diagram showing a modification of the device shown in FIG. 4.

FIG. 7 shows an arrangement in which the J-K flip-flop circuit serving as an electric filter is constituted by another circuit. Reference numeral 15 denotes a pulse generator for receiving an output signal from a comparator 4a and outputting a pulse, which is kept at High level for a predetermined time period Tw sufficiently longer than a PWM period, from an output terminal Q at the leading edge of the input signal; and 16, an OR circuit for receiving the output from the output terminal Q of the pulse generator 15 and the output from the comparator 4a. An output from the OR circuit 16 is input to a polarity switching controller 19.

Figure 8A:
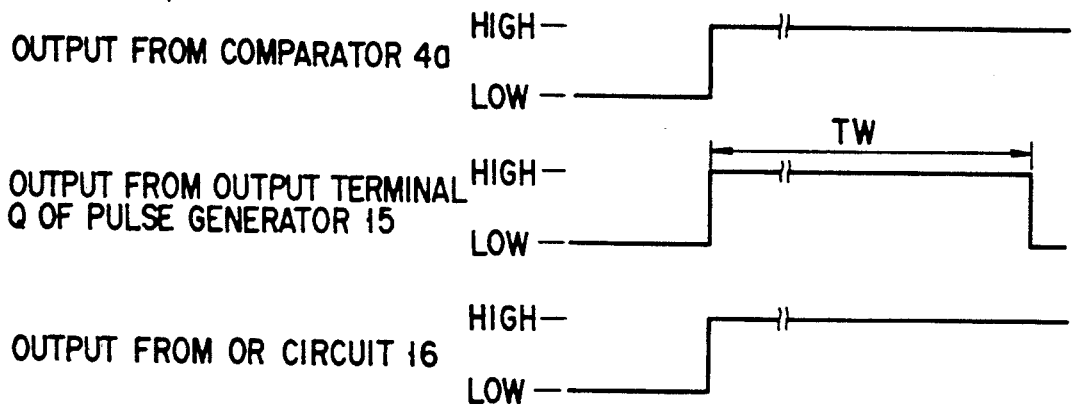
FIG. 8A is a timing chart of the device shown in FIG. 7 in a state wherein the motor is driven.
Figure 8B:
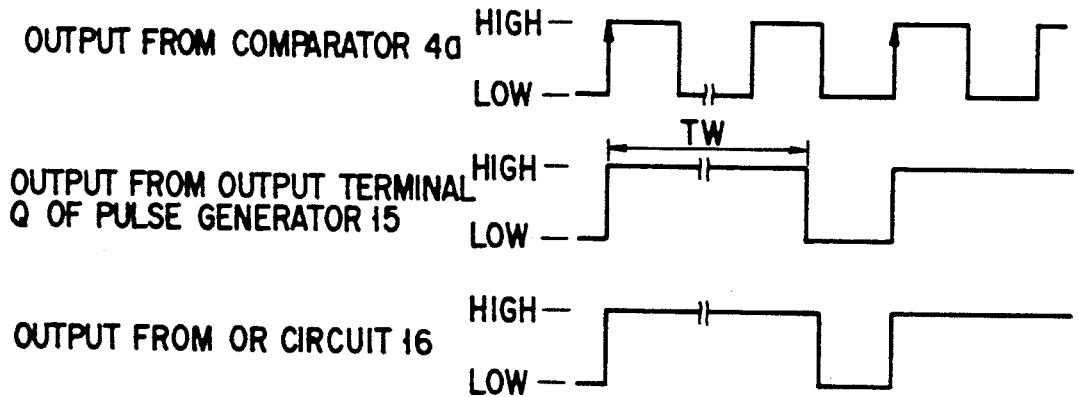
FIG. 8B is a timing chart of the device shown in FIG. 7 in a state wherein an excitation coil is stopped at a position where polarities in alternating fields are switched.

In the device shown in FIG. 7, when the motor is driven and the magnetic field detected by a Hall element 2a changes, the output from the OR circuit 16 is switched as the output signal from the comparator 4a is switched, as shown in FIG. 8A. Since the width of the pulse output from the output terminal Q of the pulse generator 15 is longer than the PWM drive period, the output from the OR circuit 16 is not switched faster than the PWM drive period. Therefore, there is no possibility that a control system for the polarity switching controller 19 is oscillated by an erroneous operation of the Hall element 2a, thus realizing stable control. Even if an excitation coil is stopped at a position where the polarities of magnets in alternating magnetic fields are switched, an input signal to the polarity switching controller 19 does not change faster than the PWM drive period because of the pulse, output from the pulse generator 15, which has a width corresponding to the predetermined time period Tw longer than the PWM drive period of a pulse output from the pulse generator 15, as shown in FIG. 8B. Therefore, an erroneous operation of the Hall element 2a and an induction field generated by the excitation coil do not influence the control system for the polarity switching controller 19. Note that the comparator used to detect a signal from the Hall element in each of the two types of devices may be replaced with an operational amplifier, and a Hall IC may be used in place of the Hall element.

Figure 3:
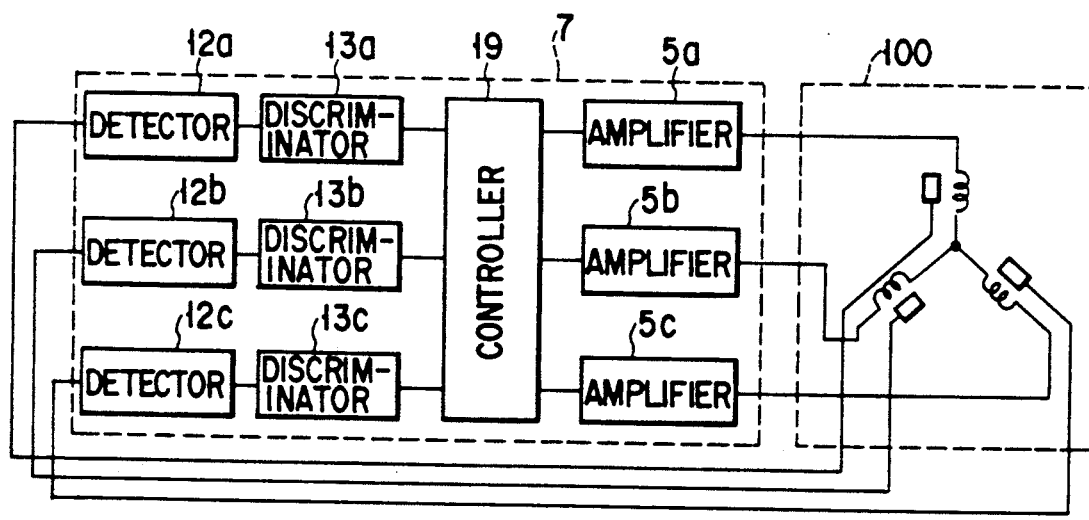
FIG. 3 is a schematic block diagram showing the arrangement of part of a driving device different from the one shown in FIG. 2.

In the circuit shown in FIG. 3, the potentials of output signals from a magnetic field detecting means or detectors 12a, 12b, and 12c are adjusted and input to a magnetic field discriminating means or discriminators 13a, 13b, and 13c, which are constituted by hysteresis circuits and designed to discriminate magnetic fields acting on the respective excitation coils by using the hysteresis characteristics of the circuits, and outputs from the magnetic field discriminating means are input to a polarity switching controller 19. The detailed arrangement of this circuit will be described below.

Figure 9:
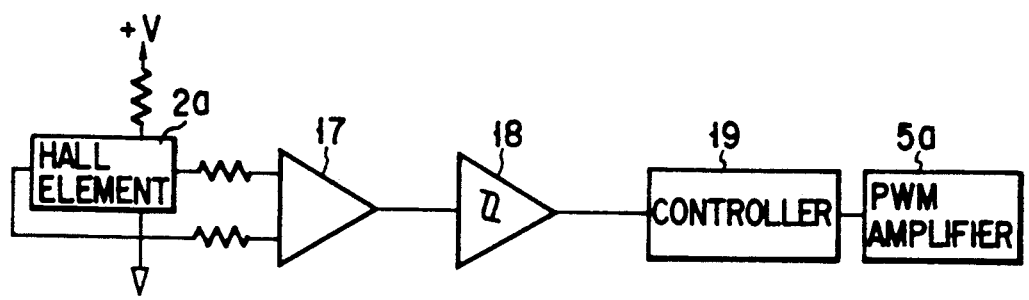
FIG. 9 is a circuit diagram showing the detailed arrangement of a circuit portion of the device shown in FIG. 3.
Figure 10A:
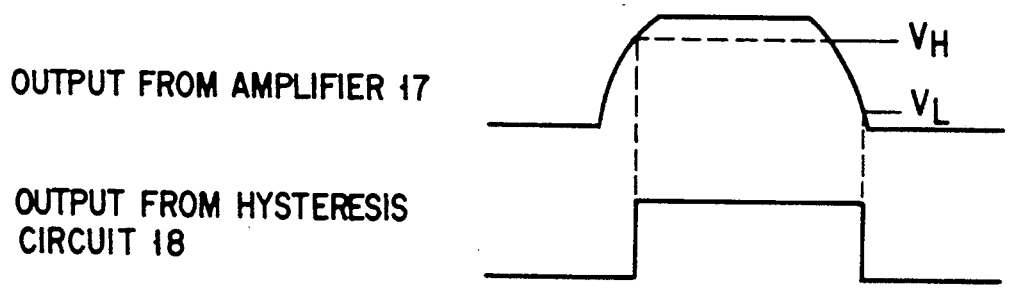
FIG. 10A is a chart showing the characteristics of a hysteresis circuit in the device shown in FIG. 9.

Referring to FIG. 9, reference numeral 2a denotes a Hall element equivalent to the one in the above-described embodiment; 17, an amplifier for amplifying the potential difference between the output terminals of the Hall element 2a; 18, a hysteresis circuit; 19, a polarity switching controller; and 5a, a PWM amplifier. In this case, as shown in FIG. 10A, the amplifier 17 amplifies the potential difference between the output terminals of the Hall element 2a, which appears when the Hall element 2a in alternating fields detects a magnetic field of the N or S pole, to a level $V_H$ or higher, and outputs the resultant signal. If the Hall element 2a detects a magnetic field from the other pole, the amplifier 17 outputs a Low-level signal. In addition, the hysteresis circuit 18 has hysteresis characteristics characterized in that when the input signal from the amplifier 17 exceeds the level $V_H$, a High-level signal is output, and when the input signal is decreased to a level $V_L$ or lower, a Low-level signal is output. Note that the Hall element 2a at a movable portion is arranged in the center of an excitation coil, similar to the above embodiment, and that each of V- and W-phase control sections (not shown) has the same arrangement as that shown in FIG. 9.

Figure 10B:
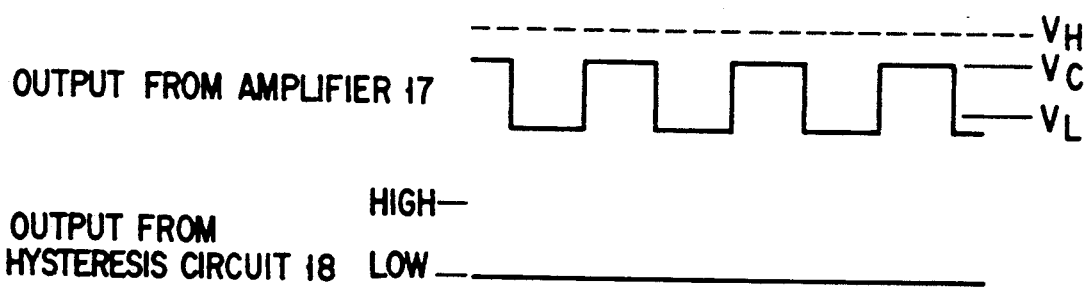
FIG. 10B is a timing chart of the device shown in FIG. 9 in a state wherein the motor is driven.

In the device having the arrangement shown in FIG. 9, as shown in FIG. 10B, even if an induction field having the same frequency as the PWM drive frequency is generated by the excitation coil, since the potential generated in the induction field, which is detected at the output terminals of the Hall element 2a and is amplified/output by the amplifier 17, is at a low level $V_C$, the output from the hysteresis circuit 18 is kept at Low level, and the induction field from the excitation coil does not influence the control system for the polarity switching controller 19, thus obtaining stable output characteristics. Note that the Hall element may be replaced with a Hall IC incorporating an amplifier having proper hysteresis characteristics.

All the above-described devices are associated with a three-phase linear DC motor. It is, however, apparent that the present invention can be applied to other multipolar type linear DC motors.

According to the controller having the above-described arrangement, the polarity switching controller for the multipolar type linear DC motor of the PWM driving scheme includes the electric filters for removing output signals from the magnet polarity detecting means which have the same period as the PWM drive period, or the magnetic field discriminating means for adjusting the potentials of output signals from the magnetic field strength detecting means and inputting the resultant signals to the hysteresis circuits so as to discriminate magnetic fields acting on the respective excitation coils. With this arrangement, even if each excitation coil is located at a position where the polarities of the magnets in alternating fields are switched, a control operation can be performed without being influenced by an induction field generated by the excitation coil, thus stably supplying the supply current, and obtaining stable output characteristics.

Figure 11:
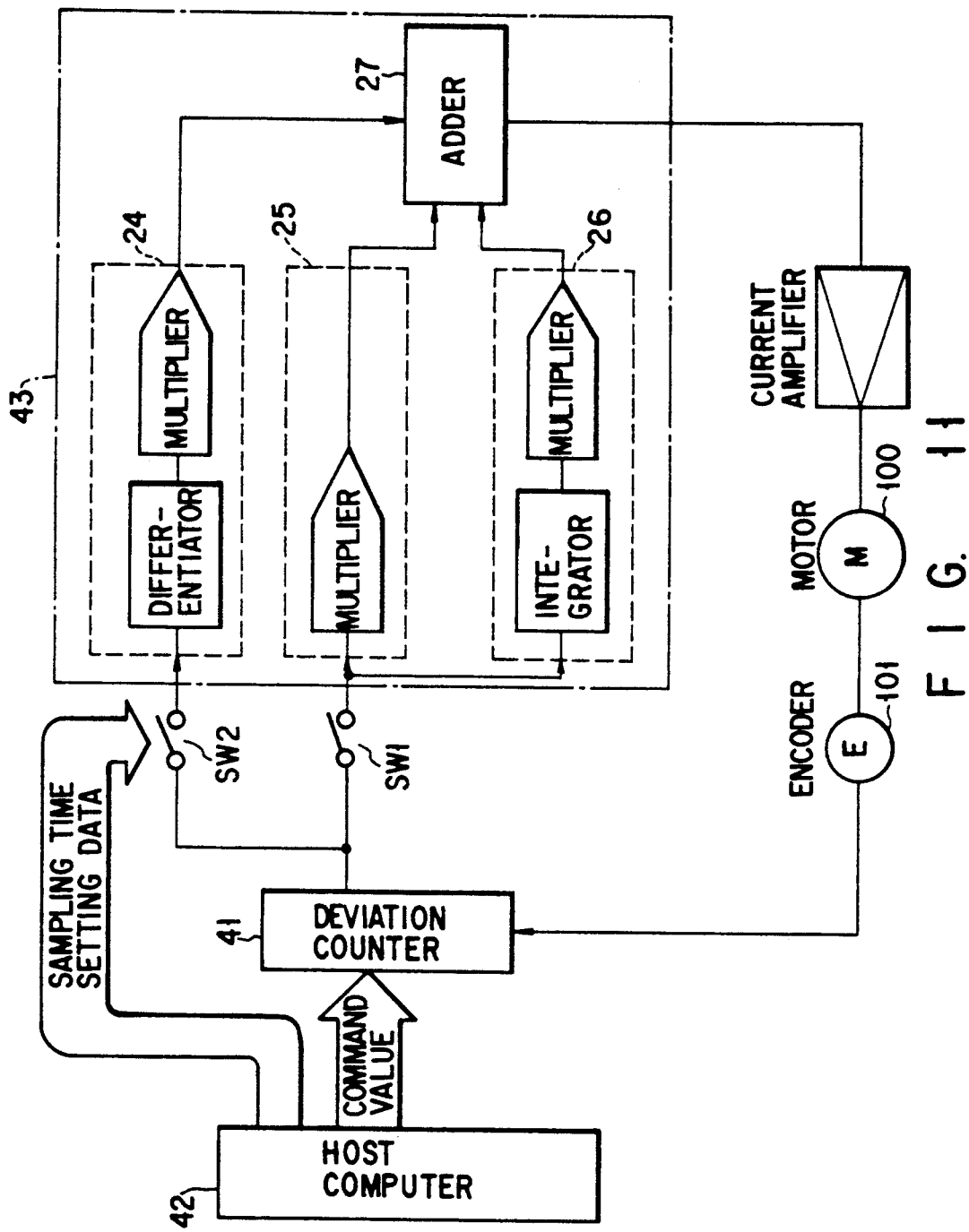
FIG. 11 is a block diagram showing a position controller of a device according to an embodiment of the present invention.

The position controller C2 shown in FIG. 1 will be described below with reference to FIG. 11.

One input terminal of a deviation counter 41 is connected to the output terminal of an incremental encoder 101 for detecting the driving state of the motor 100 on the basis of the moving state of the movable stage. The encoder 101 outputs an electric pulse signal to the deviation counter 41 in real time in accordance with the moving distance of the stage. The other input terminal of the deviation counter 41 is connected to the output side of a host computer 42. With this arrangement, the deviation counter 41 outputs a signal representing the deviation between a target speed value and an encoder pulse signal from the encoder 101 to a PID operation section 43. The PID operation section 43 comprises a differential operation system 24 constituted by a differentiator and a multiplier, a proportional operation system 25 constituted by a multiplier, an integral operation system 26 constituted by an integrator and a multiplier, and an adder 27 for adding output values from the respective systems. The deviation signal output from the deviation counter 41 is input to the proportional operation system 25 and the integral operation system 26 through a switch SW1, whereas the deviation signal from the deviation counter 41 is input to the differential operation system 24 through a switch SW2 controlled by the host computer 42 at a sampling timing (to be described later). The adder 27 connected to the output terminals of the respective operation systems 24, 25, and 26 outputs a control signal, obtained by adding output values from the respective systems, to a current amplifier 46. The motor 100 us controlled in accordance with an output signal from the amplifier 46.

Figure 13:
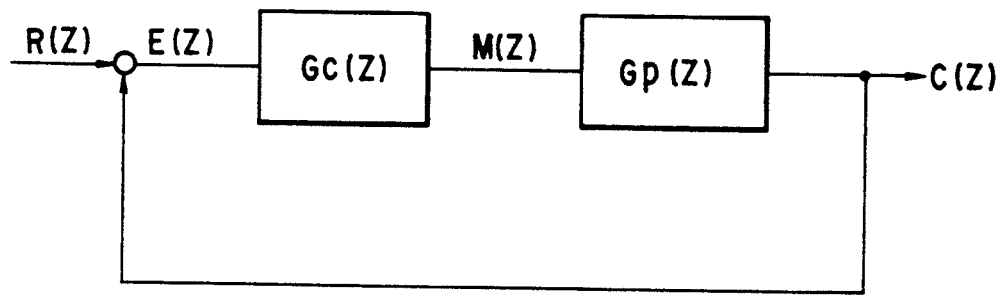
FIG. 13 is a block diagram showing transfer functions to explain the control principle of the device shown in FIG. 11.

The control principle of the function of the PID operation section will be described below with reference to the transfer functions shown in FIG. 13.

If the pulse transfer function of a servo section is represented by Gc(z); the pulse transfer function of a process section, Gp(z); a target value, R(z); a deviation, E(z); an operation variable, M(z); a control amount, C(z); and a total pulse transfer function, Ct(z), then the following equation can be established:

$$E(z) = R(z) - C(z) \qquad (1)$$

In addition, Gc(z) and Gp(z) are represented as follows:

$$Gc(z) = M(z)/E(z) \qquad (2)$$

$$Gp(z) = C(z)/M(z) \qquad (3)$$

The total pulse transfer function Ct(z) is given by $$\begin{aligned} Ct(z) &= C(z)/R(z) \\ &= [Gc(z) \cdot Gp(z)/[1 + Gc(z) \cdot Gp(z)] \end{aligned} \qquad (4)$$

In this case, since the servo section is constituted by the PID operation, the contents of P, I, and D are represented as follows.

In position control, if a proportional gain $K_P$ is set, a deviation at a time point n is given by $$m_n = K_P e_n \qquad (5)$$

Therefore, the pulse transfer function of the proportional operation system is represented as follows:

$$G_{CP}(z) = M(z)/E(z) = K_P \qquad (6)$$

In integral control, if an integral gain $K_I$ and a sampling time Ts are set, the pulse transfer function of the integral operation system is given by $$G_{CI}(z) = K_I Ts/(Z-1) \qquad (7)$$

In differential control, if a differential gain $K_D$ is set, the pulse transfer function of the differential operation system is given by $$G_{CD}(z) = K_D(Z-1)/(Ts \cdot Z) \qquad (8)$$

If these functions are added, the following equation can be obtained:

$$G_C(z) = G_{CP}(z) + G_{CI}(z) + G_{CD}(z) \quad (9)$$
$$= (a_0 z^2 + a_1 Z + a_2)/Z(Z-1)$$

where $$a_0 = K_P + K_D/Ts \quad (10)$$

$$a_1 = K_I Ts - K_P - 2K_D/Ts \quad (11)$$

$$a_2 = K_D/Ts \quad (12)$$

An nth operation amount $m_n$ is represented by $$m_n = a_0 e_n + a_1 e_{n-1} + a_2 e_{n-2} + m_{n-1} \quad (13)$$

The term of the differential operation in equation (8) is characterized in that feedback of C(z) greatly enhances the variation. As indicated by equations (10) to (13), since the variation enhanced by the differential operation is added to the operation results of the proportional term and the integral term on each transfer function, the variation in the differential term must be minimized. Especially, since only the sampling time of the differential term is present in the term of $a_2$ in equation (13), the necessity to suppress the variation is further increased.

Since this variation rate is determined by the ratio between the sampling time and the time interval of encoder pulses, the encoder pulse interval gradually approaches the sampling time to increase the variation in differential value with a decrease in moving speed of the stage.

Differential control serves to compensate for the delay of an output with respect to an input, which is caused by integral control.

In the above-described circuit, therefore, the sampling time in differential control is set to be long in a very low-speed range in which output delay poses almost no problems.

An operation of the controller C2 will be described in detail below.

Figure 12A:
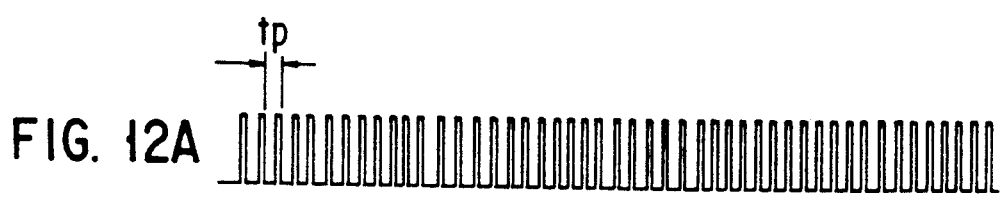
FIGS. 12A to 12D are timing charts for explaining the control cycle of the device shown in FIG. 11.
Figure 12B:
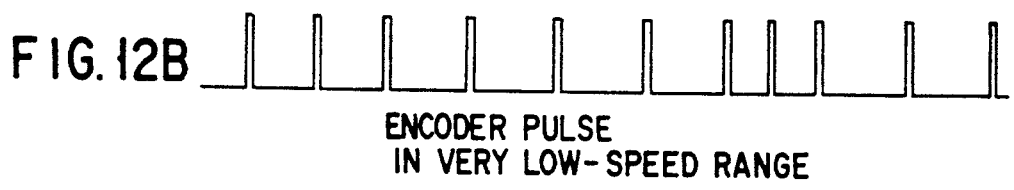
Figure 12C:
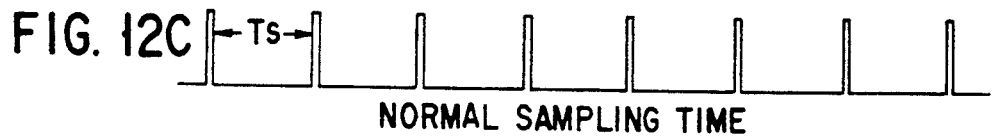

In the controller C2, the switch SW1 for determining the sampling time Ts of the integral operation system 26 and the proportional operation system 25 is ON/OFF-controlled at a timing at which the computational performance of the computer is maximized. On the other hand, the switch SW2 for determining the sampling time of the differential operation system 24 is variably controlled by the host computer in accordance with a target speed value. More specifically, in a normal speed range in which encoder pulses having the short pulse interval (tp) shown in FIG. 12A are output, the switch SW2 is ON/OFF-controlled to set a sampling time (the normal sampling time shown in FIG. 12C) having the same pulse interval (Ts) as that of the integral operation system 26 and the proportional operation system 25. In the very low-speed range, the switch SW2 is ON/OFF-controlled to set a sampling time (FIG. 12D) having a pulse interval sufficiently longer than that of the encoder pulse (FIG. 12B) in the very low-speed range.

Figure 12D:
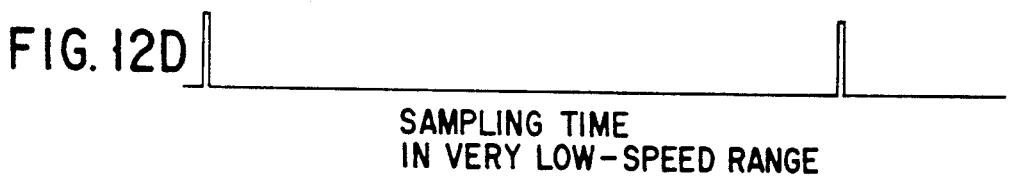

Consequently, in the very low-speed range, as shown in FIG. 12D, the sampling time of only the differential operation system 24 is prolonged to suppress the variation in differential value, while the integral operation system 26 and the proportional operation system 25 perform arithmetic processing in the conventional control cycle. Speed control in the very low-speed range can be stabilized without changing the values of the respective parameters $K_P$, $K_I$, and $K_D$ of PID, thereby allowing a smooth moving operation of the stage.

Figure 14A:
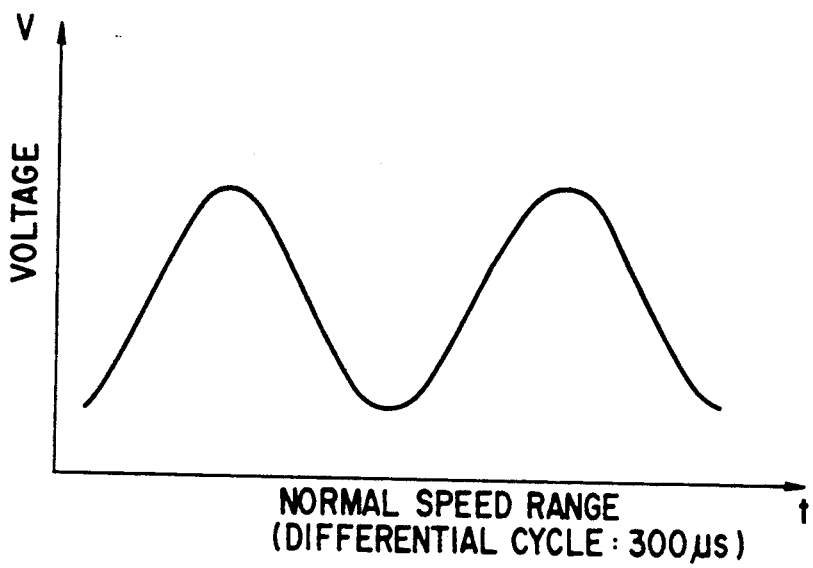
FIGS. 14A to 14C are graphs showing a comparison between the control cycle of the device shown in FIG. 11 and the control cycle of the conventional device.
Figure 14B:
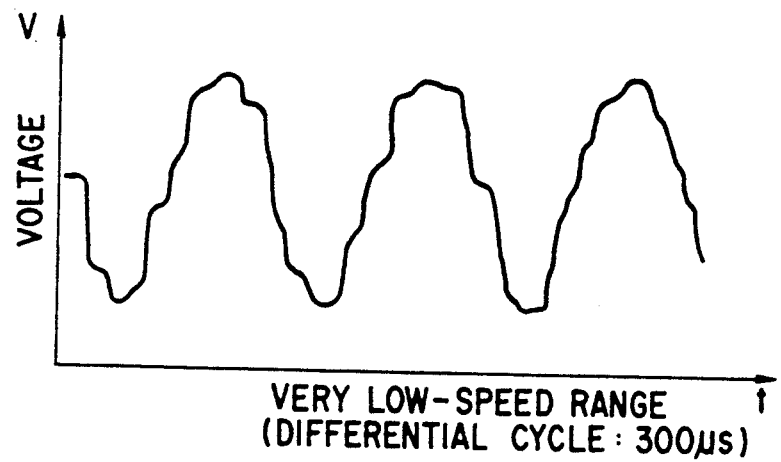
Figure 14C:
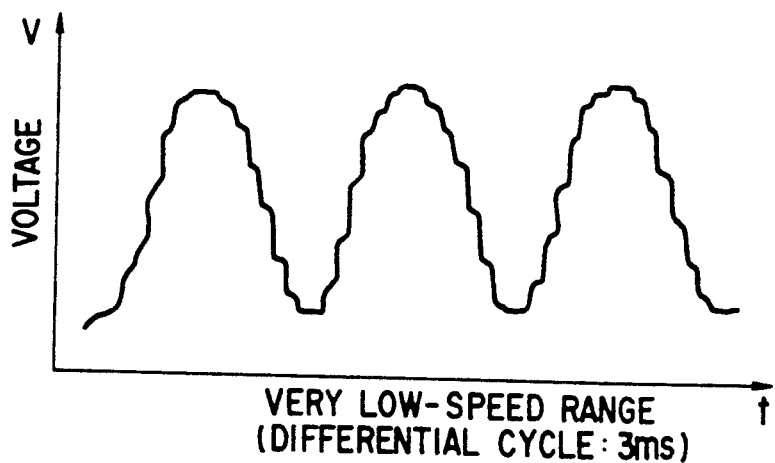

FIGS. 14A to 14C show a comparison between the control cycle of the circuit including the switch SW2 and that of the circuit (prior art) without the switch SW2. FIG. 14A shows a waveform obtained by both the embodiment and the prior art in the normal speed range. In this case, a perfect sine wave including no speed variation is obtained. Note that in these graphs, as a sine wave is perfected, the variation is reduced. FIG. 14B shows a waveform obtained when the stage is fed at a very low speed, and control is performed at the same sampling time as that of the differential cycle in the normal speed range. This corresponds to the conventional control cycle. FIG. 14C shows a waveform obtained by the control cycle of the embodiment when the stage is fed at a very low speed. In comparison with the waveform in FIG. 14C, the waveform in FIG. 14B is not constant in shape and has large stepped portions. This indicates that the stage has irregular stick/slips. In contrast to this, the respective waveform portions in FIG. 14C are almost identical to each other, and the overall waveform is close to a sine wave.

According to this embodiment, the switch SW1 for determining the control cycle of the integral operation system 26 and the proportional operation system 25 is ON/OFF-controlled at the timing at which the computational performance of the computer can be maximized, whereas the switch SW2 for determining the differential control cycle of the differential operation system 24 is variably controlled in accordance with a target speed value output from the host computer 42 to the deviation counter 41. Therefore, even if the stage feed speed is set in the very low-speed range, a smooth operation with small speed variation can be realized, thus greatly reducing the degree of fatigue of the eyes of an operator even in a screening test. In addition, since an observer, a high-resolution encoder, a tachometer generator, and the like are not used, a great reduction in cost and size of the device can be achieved.

The use of the controller C2 having the arrangement described in detail above provides a stage control device which can smoothly move the stage with high precision and good response characteristics even in the very low-speed range, and can prevent an increase in cost and size of the device.

Figure 15:
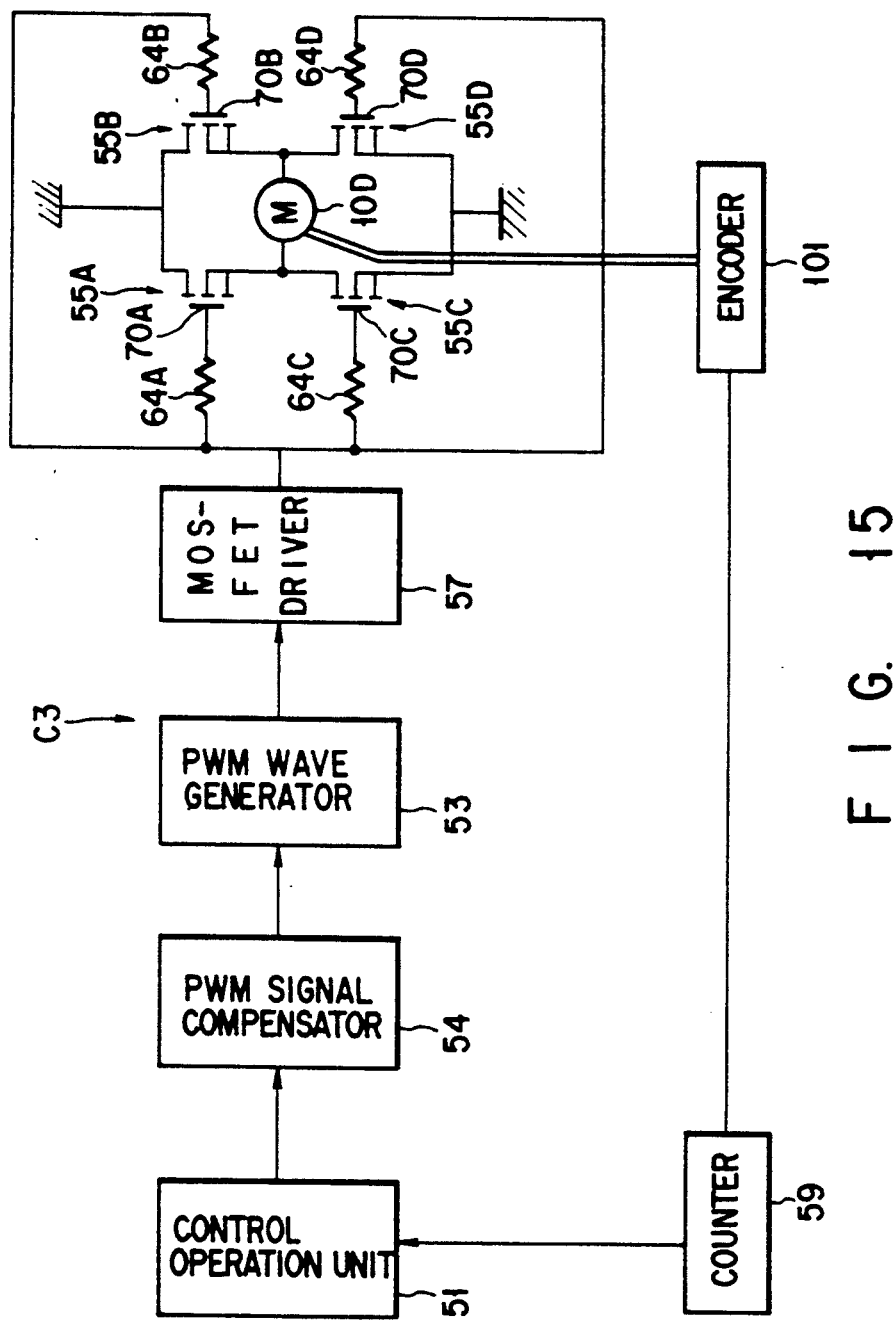
FIG. 15 is a block diagram showing a driving controller for driving a linear motor.

The driving controller C3 will be described next with reference to FIG. 15.

In a control operation unit 51 such as a DSP, in accordance with a predetermined control algorithm, a control amount is calculated by referring to a command value and a detected value, and a PWM signal is determined. In this case, the control operation unit 51 performs a control operation on the assumption that the subsequent driving system and amplification system are of linear type.

In this embodiment, for example, an 8-bit address signal is used as a PWM signal. In this case, a maximum of 256 types of PWM waves are stored in a PWM wave generator 53 in correspondence with the respective address signals. These PWM waves have different effective times.

A ROM 54 is used as a PWM signal compensator. A PWM signal output from the control operation unit 51 is input to the ROM 54. In the ROM 54, the PWM signal is collated with a reference tape incorporated therein. As a result, a compensated PWM signal is output. This compensated PWM signal is input to the PWM wave generator 53. The generator 53 then outputs a compensated PWM wave corresponding to the compensated PWM signal. The compensated PWM wave oscillated in this manner passes through a MOSFET driver 57 and further passes through four parallel-connected gate resistors 64A, 64B, 64C, and 64D. At this time, the PWM wave has already been converted into a gate drive pulse. The gate drive pulse is input to gates 70A, 70B, 70C, and 70D of power MOSFETs 55A, 55B, 55C, and 55D.

By using the power MOSFETs 55A, 55B, 55C, and 55D as switching elements, driving and stopping operations of the linear motor 100 are switched. The linear encoder 101 and a counter 59 are sequentially connected to the linear motor 100. A measurement value is supplied from the counter 59 to the control operation unit 51.

Compensation of the PWM signal will be described further in detail below.

Figures 20A, 20B:
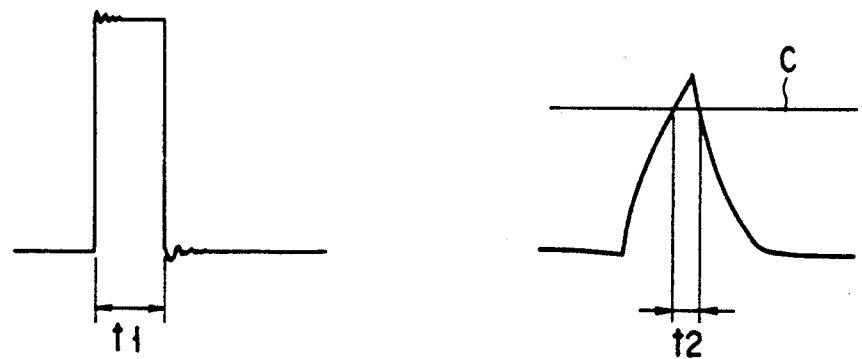
FIGS. 20A and 20B are graphs respectively showing a PWM waveform and a gate drive pulse corresponding to the PWM waveform.

Assume that the PWM wave has the waveform shown in FIG. 20A. In this case, a corresponding gate drive pulse has the waveform shown in FIG. 20B. The effective time of the PWM wave is represented by $t_1$; and the effective time of the gate drive pulse, $t_2$. Similarly, if the PWM wave has the waveform shown in FIG. 21A, a corresponding drive pulse wave has the waveform shown in FIG. 21B. In this case, the effective time of the PWM wave is represented by $t_3$; and the effective time of the gate drive pulse, $t_4$.

In general, if the effective time of the PWM wave is shortened to reduce the pulse width, the distortion of the gate drive pulse is increased to shorten its effective time. This characteristic is represented, for example, by a curve E in FIG. 19.

In contrast to this, in this embodiment, the PWM signal is converted first into the compensated PWM signal by the ROM 54. In this operation, the reference table or curve shown in FIG. 17 is used. More specifically, the effective time of the compensated PWM wave corresponding to the compensated PWM signal output from the ROM 54 is set to plot a curve F slightly protruding in the upper left direction with respect to the effective time of the PWM wave corresponding to the PWM signal output from the control operation unit in FIG. 17.

More specifically, if the PWM wave having the effective time $t_2$ is to be input to the gates, the effective time of the compensated PWM wave is set to $t_1$. If the PWM wave having the effective time $t_1$ is to be input to the gates, the effective time of the compensated PWM wave is set to $t_3$.

Figure 18:
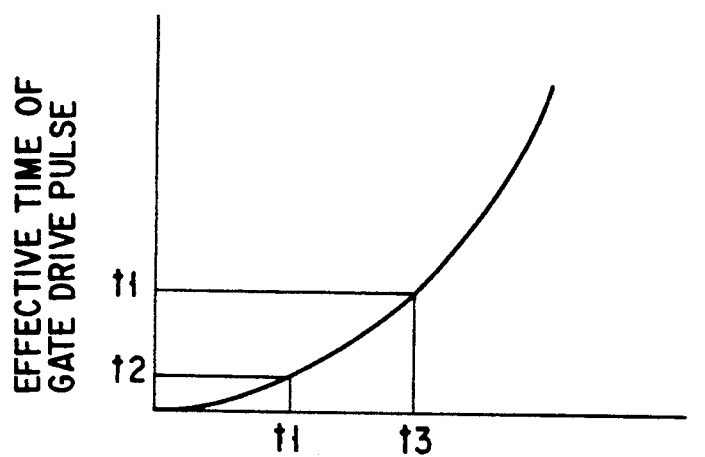
FIG. 18 is a graph showing the relationship between the effective time of a compensated PWM wave and that of a gate drive pulse.

The compensated PWM wave generated by the PWM wave generator 53 is converted into a gate drive pulse by the gate resistors and the electric influences of the gates, as described above. FIG. 18 shows the relationship between the effective time of the compensated PWM wave and the effective time of the gate drive pulse. As shown in FIGS. 20A and 20B and FIGS. 21A and 21B, when the effective times of the compensated PWM waves are set to $t_1$ to $t_3$, the effective times of the gate drive pulses are set to $t_2$ and $t_4$.

Figure 19:
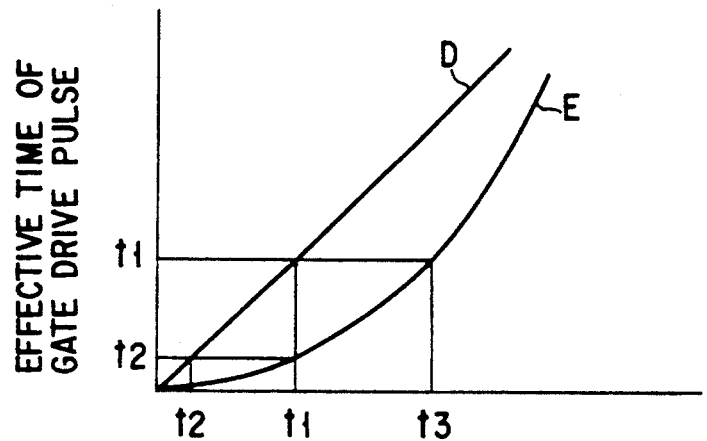
FIG. 19 is a graph showing the relationships between the effective times of PWM waves and those of gate drive pulses in the driving controller of the embodiment and that of the conventional device.

Finally, the effective time of the PWM wave corresponding to the PWM signal from the control operation unit 51 and that of the gate drive pulse have the relationship represented by a curve D in FIG. 19. With this operation, the difference between the effective time of the PWM wave and that of the gate drive pulse is compensated. As a result, the same control performance as that obtained by a driving control device using a so-called linear amplifier can be obtained.

In addition, according to this embodiment, since linear approximation is performed in the control operation unit 51, arithmetic processing is performed at high speed to output the PWM signal in accordance with a relatively simple algorithm. Therefore, the control cycle can be shortened in linear motor control demanding real-time control and high-speed response, resulting in higher control performance.

Furthermore, since the deformation of the PWM wave by the gate resistors 64A, 64B, 64C, and 64D is almost uniquely determined with respect to the compensated PWM waveform generated by the PWM wave generator 53, such a compensating operation need not be incorporated in the control operation unit 51.

According to the above-described driving controller, since the difference between the effective time of the PWM wave and that of the gate drive pulse can be compensated by inputting the compensated PWM signal to the PWM wave generator, control can be performed with higher precision than that of the prior art. That is, the settling time can be shortened in the positioning control system, and fluctuations of the speed can be suppressed in the speed control system, thereby realizing almost the same control performance as that obtained by the driving controller using a so-called linear amplifier.

Moreover, since the power MOSFETs are used as switching elements, and a high-cost, low-efficiency linear amplifier is not used, a low-cost, high-efficiency device can be realized. In addition, since the gate resistors are arranged between the PWM wave generator and the gates, abrupt current amplification can be prevented, and a reduction in noise can be achieved.

A stage assembly on which the above-described motor 100 and the endocer 101 are arranged will be described below with reference to FIGS. 22 and 23.

As shown in FIG. 22, a linear motor type scanning stage of this embodiment includes a stationary stage 102 mounted on a microscope main body (not shown). On this stationary stage 102, a traveling stage 104 is arranged to be capable of traveling in the horizontal direction. Linear movement guides 106 are inserted between the stationary stage 102 and the traveling stage 104 to guide the travel of the traveling stage 104. A coil 100b fixed to a yoke 100a is embedded in the upper portion of the stationary stage 102. A magnet 100d fixed to a yoke 100c is embedded in the lower portion of the traveling stage 104 so as to oppose the coil 100b. The yoke 100a, the coil 100b, the yoke 100c, and the magnet 100d constitute the linear motor 100.

A knob shaft 112a extending in the vertical direction is rotatably mounted on one side of the traveling stage 104. A friction wheel 112b friction-engaged with a friction member 114 fixed to the lower surface of the stationary stage 102 is fixed to an intermediate portion of the knob shaft 112a to be coaxial with the knob shaft 112a. In addition, an operation knob 112 for rotating the knob shaft 112a is fixed to the lower end portion of the knob shaft 112a. The operation knob 112, the knob shaft 112a, the friction wheel 112b, and the friction member 114 constitute a fine driver for performing fine manual driving of the traveling stage 104.

A linear scale 101a is fixed to the lower surface of the traveling stage 104. The head portion of a detection head 101b for reading the linear scale 101a is located below the linear scale 101a. The detection head 101b is fixed on the other side of the lower surface of the stationary stage 102 with respect to the friction member 114. The linear scale 101a and the detection head 101b constitute the linear encoder 101. The linear encoder 101 is connected to a controller 118 to read the linear scale 101a and supply a position signal corresponding to the moving amount of the movable stage to the controller 118. The controller 118 includes a storage section or memory for storing the position signal, and a driving source for supplying power to the coil 100b of the motor 100 to drive the motor 100. The output terminal of the controller 118 is connected to the coil 100b through a switch 120. The switch 120 is fixed to the front surface of the stationary stage 102, as shown in FIG. 23. The switch 120 serves to disconnect the supply of power from the driving source to the linear motor 100 but does not disconnect the linear encoder 101 and the controller 118 from each other.

The function of the linear motor type scanning stage assembly having the above-described arrangement will be described below.

When a target position, to which the traveling stage 104 is manually moved at high speed and finely adjusted, is to be stored, and the movement to the target position is to be repeated afterward, the switch 120 is opened first to turn off the linear motor 100. With this operation, the traveling stage 104 can be manually moved at high speed. After high-speed, coarse movement of the traveling stage 104 is performed, the operation knob 112 is rotated to finely operate the traveling stage 104 so as to move it to the target position. Upon reception of a position signal corresponding to the target position from the linear encoder 101, the controller 118 reads and stores the target position. When the switch 120 is closed, the traveling stage 104 can always be moved to the set position by the motor 100 with excellent repeatability in accordance with the stored position signal.

Figure 24:
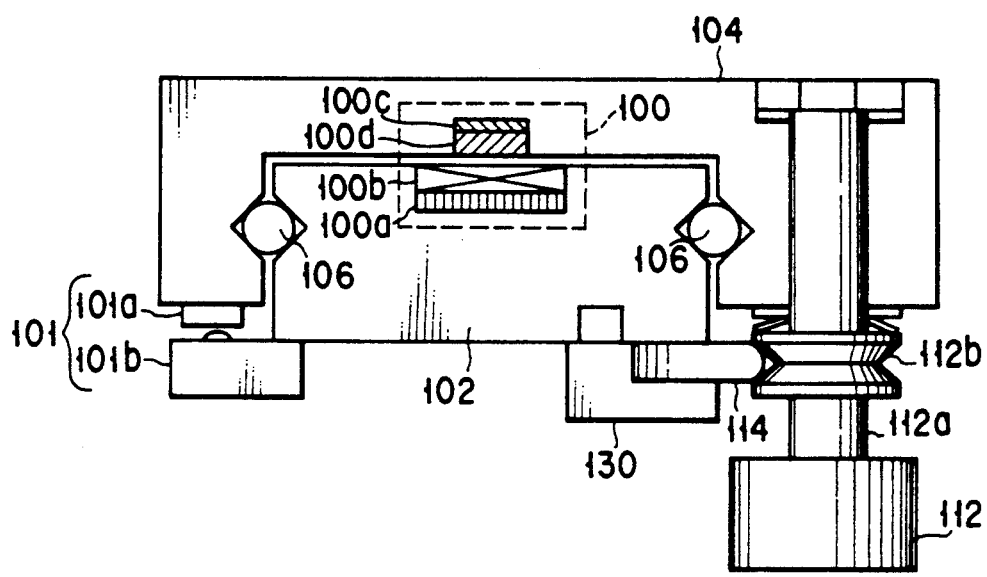
FIG. 24 is a front view showing another linear motor type scanning stage.

A modification of the stage assembly will be described below with reference to FIGS. 24 to 26. Note that the same reference numerals in this modification denote the same parts as in the previous example, and a description thereof will be omitted.

The basic arrangement of this assembly is almost the same as that described above except that a link mechanism is arranged to engage/disengage a friction wheel 112b with/from a friction member 114. The friction member 114 shown in FIG. 24 is mounted on a stationary stage 102 to be moved within an X-Y plane by first and second link members 130 and 132 constituting the link mechanism, as shown in FIG. 25. The proximal end portion of the first link member 130 is mounted on the stationary stage 102 to be rotated by a rotating shaft 130a, while the distal end portion of the member 130 is rotatably mounted on one end portion of the friction member 114. The second link member 132 is an L-shaped member. The central bent portion of the second link member 132 is mounted on the stationary stage 102 to be rotated by a rotating shaft 132a, while the distal end portion of the member 132 is rotatably fixed to the other end portion of the friction member 114.

The friction member 114 is biased toward the friction wheel 112b by two leaf springs 134 fixed to the stationary stage 102 so as to be friction-engaged with the friction wheel 112b shown in FIG. 25. The proximal end portion of the second link member 132 is operatively connected to a solenoid 136. When this solenoid 136 is biased, the link member 132 is pivoted in the counterclockwise direction in FIG. 25 to shift the friction member 114 from the friction wheel 112b against the biasing force of the two leaf springs 134, thus releasing the engagement between the friction member 114 and the friction wheel 112b. The solenoid 136 is turned on/off by a second solenoid switch 140 (FIG. 26). The second switch 140 is connected to a first switch 120 to operate the solenoid 136 when the switch of the linear motor 100 or the first switch 120 is turned off and vice versa. As shown in FIG. 26, the second switch 140 is mounted on the front surface of the stationary stage 102 to be located adjacent to the first switch 120.

The function of the scanning stage assembly having the above-described arrangement will be described below. When the first switch 120 is turned on, the solenoid 136 is operated to release the engagement between the friction member 114 and the friction wheel 112b, and the linear motor 100 is driven to move the traveling stage by the moving amount controlled by the controller 118. When the switch 120 is turned off, the linear motor 100 and the controller 118 are disconnected from each other, and the solenoid 136 is turned off to cause the springs 134 to engage the friction member 114 and the friction wheel 112b with each other. As a result, the traveling stage 104 can be manually moved.

With the above-described arrangement, when the first switch 120 is closed to cause the linear motor to electrically drive the stage 104, since the friction wheel and the friction member are disengaged from each other, no excessive load is applied to the linear motor, thus suppressing the generation of heat and reducing the power consumption.

Another modification of the linear motor type scanning stage assembly will be described below with reference to FIG. 27.

Figure 26:
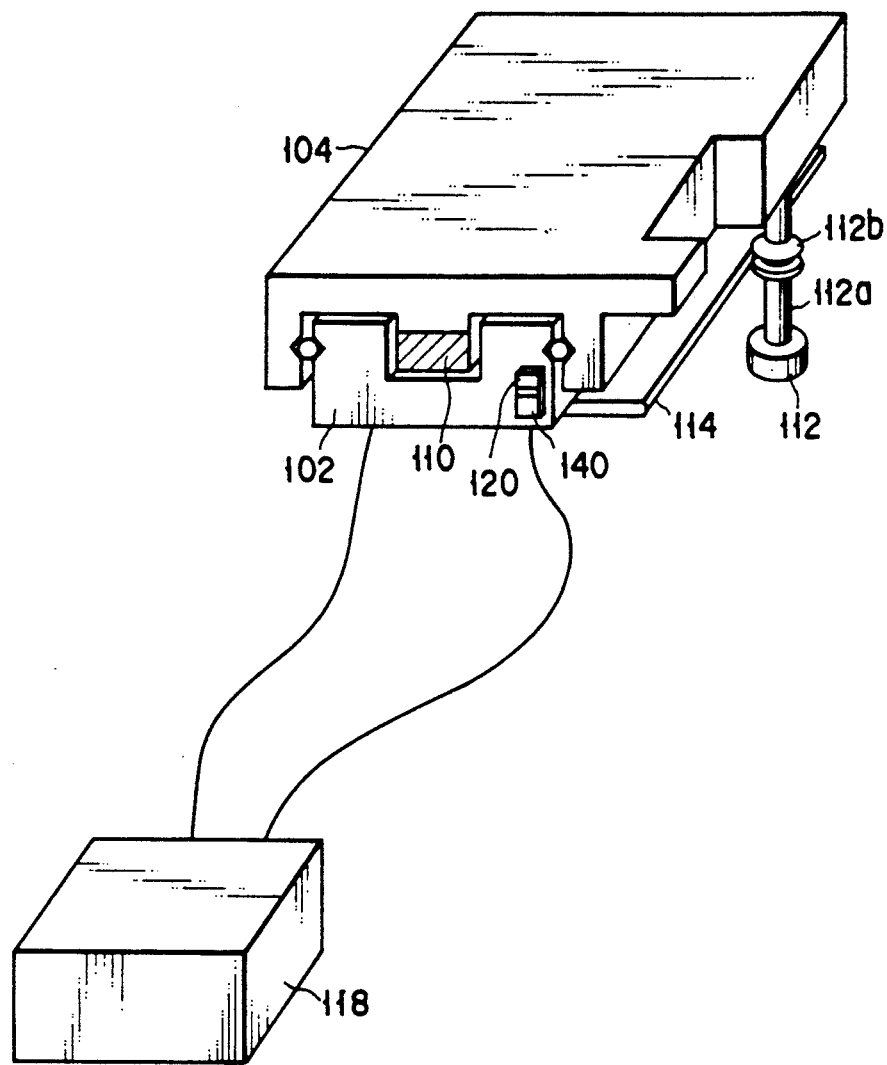
FIG. 26 is a perspective view showing the scanning stage in FIG. 24.
Figure 29:
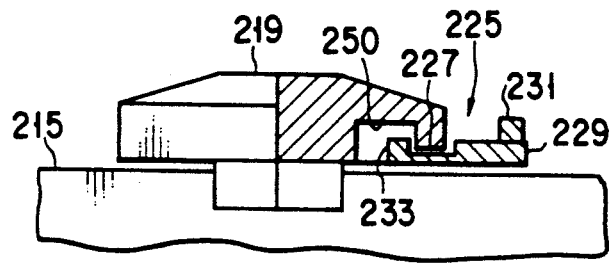
FIG. 29 is an enlarged sectional view showing a hinge portion formed on the specimen holder shown in FIG. 28.
Figure 30:
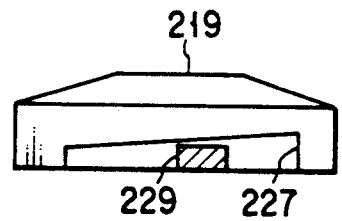
FIG. 30 is a view showing the shape of a wedge-like groove formed in the hinge portion shown in FIG. 29.

This stage assembly is equivalent to the one shown in FIG. 26 except that a touch switch 150 having the same function as that of the switch 120 is added. The touch switch 150 is fixed to the front surface of a manual operation portion 104a as a front portion of one side of the traveling stage 104. The touch switch 150 is designed such that while the switch is not touched, the linear motor 100 is turned on and vice versa. The touch switch 150 and the switch 120 are connected such that when one of the switches is operated, the linear motor is turned off.

According to this modification, the stage can be manually moved at high speed without operating the solenoid switch 120. This is because when the manual operation portion 104a is gripped by a hand, the touch switch 150 is touched to turn off the linear motor 100, thus allowing a manual high-speed/coarse moving operation.

The above-described modification has been described with reference to a single axis stage designed to travel in one direction. However, the present invention can be applied to an X-Y axis stage and the like.

The use of the above-described stage assembly provides a linear motor type scanning stage which can actively perform manual high-speed moving and fine adjusting operations with respect to the movable stage, and can accurately repeat a moving operation to a stored position.

A microscope stage with a specimen holder as a practical example of the above-described stage will be described below with reference to FIGS. 28 to 32.

FIG. 28 shows the arrangement of part of the microscope stage with the specimen holder.

As shown in FIG. 28, the microscope stage with the specimen holder is designed such that the specimen holder is movably mounted on a microscope stage (stationary stage) 104.

The specimen holder comprises a specimen holder main body 201 and first to third abutment pawls 209, 211, and 213. The specimen holder main body 201 is supported by a guide (movable stage) 252 capable of moving in the X direction. The first abutment pawl 209 is formed on the specimen holder main body 201. One short side 203a of a rectangular slide glass 203 can be brought into contact with the first abutment pawl 209. A portion of one long side 203b which is located close to the short side 203a, and another portion of the side 203b which is located apart from the short side 203a can be brought into contact with the second and third abutment pawls 211 and 213, respectively. In addition, a pivot pawl 215 is formed on a portion of the specimen holder main body 201 which is located near the third pawl abutment 213. The proximal end portion of the pivot pawl 215 is supported on the specimen holder main body 201 to be freely pivoted about a shaft portion within a horizontal plane.

The pivot pawl 215 is bent in the direction of the first and second abutment pawls 209 and 211 toward its distal end. In addition, the pivot pawl 215 is always biased toward the first to third abutment pawls 209, 211, and 213 (in the clockwise direction in FIG. 28) by a spring (not shown) so that when the slide glass 203 is brought into contact with the first to third abutment pawls 209, 211, and 213, a corner portion 203d of the other side 207 of the slide glass 203 is pushed toward the first to third abutment pawls 209, 211, and 213. As a result, the slide glass 203 is held between the pivot pawl 215 and the first to third pawls 209, 211, and 213. A specimen holder knob 217 extends from the proximal end portion of the pivot pawl 215. With this structure, when the specimen holder knob 217 is pivoted counterclockwise against the biasing force of a spring, or the specimen holder knob 217 is released to cause the biasing force of the spring to pivot the specimen holder knob 217 clockwise, the pivot pawl 215 is pivoted in a direction S in FIG. 28.

The arrangement of the pivot pawl 215 will be described below with reference to FIGS. 28 to 31.

A disk-like hinge portion 219 is coaxially mounted on the distal end of the shaft portion extending from the proximal end portion of the pivot pawl 215 so as to be pivoted together with the pawl 215. Since this proximal end portion extends through a through hole formed in the specimen holder main body 201, and the pivot pawl 215 and the hinge portion 219 are located on the two sides of the main body 201, the pivot pawl 215 is pivotally mounted on the main body 201, as described above. An engaging groove 223 with which a microswitch 221 (to be described later) can be engaged is formed in the outer circumferential surface of the hinge portion 219. A brake mechanism 225 which can be engaged with a wedge-like groove 227 is arranged at an outer peripheral portion of the hinge portion 219. The above-mentioned wedge-like groove 227 is formed in the outer peripheral portion of the hinge portion 219. The wedge-like groove 227 is formed to become shallower from one end toward the other (see FIG. 30 in particular). The brake mechanism 225 comprises a brake bar 229 having one end inserted into a recess 250 in the hinge portion through the wedge-like groove 227 and capable of moving along the groove 227; a gripping projection 231 extending from the other end of the brake bar 229, and a guide projection 233 extending from one end of the brake bar 229 and adapted to guide the brake mechanism 225 along the outer peripheral portion of the hinge portion 219 (see FIG. 29).

Figure 31:
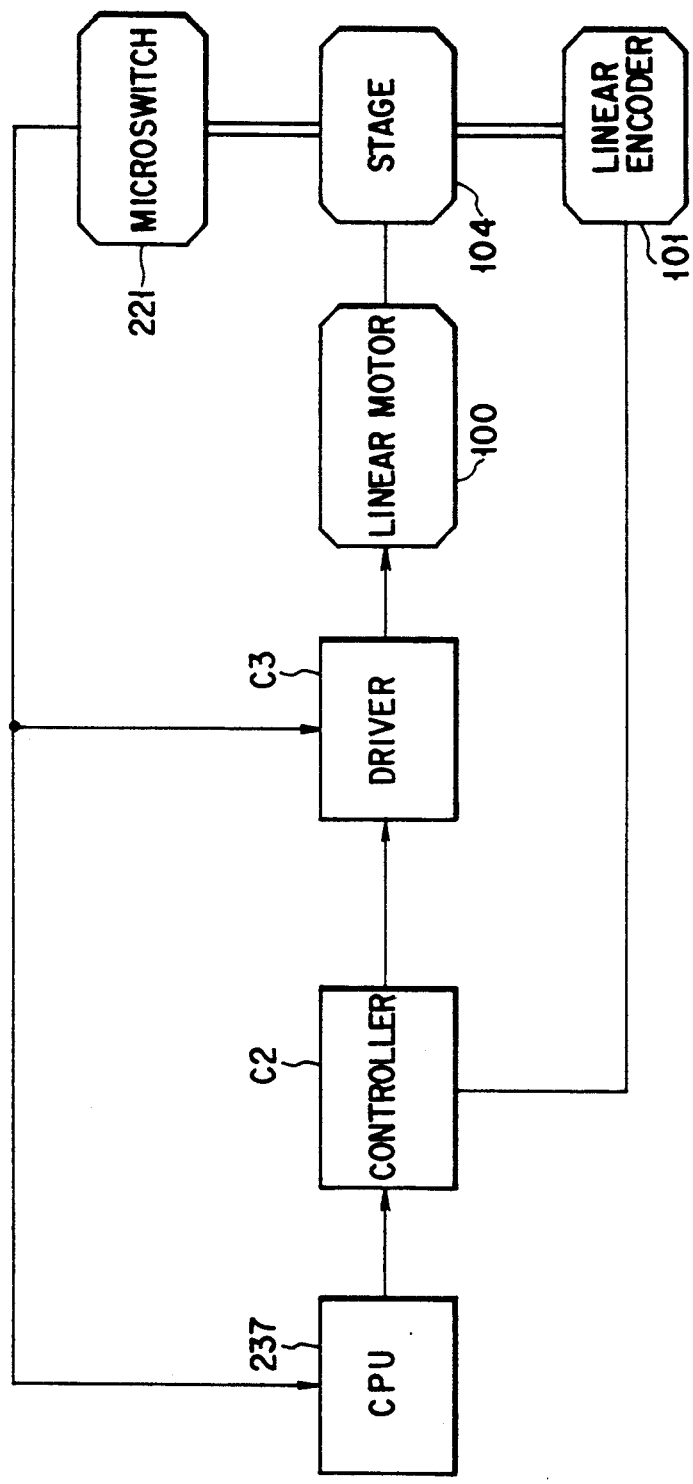
FIG. 31 is a block diagram showing the arrangement of a driving system connected to a microswitch formed on the specimen holder shown in FIG. 28.
Figure 33:
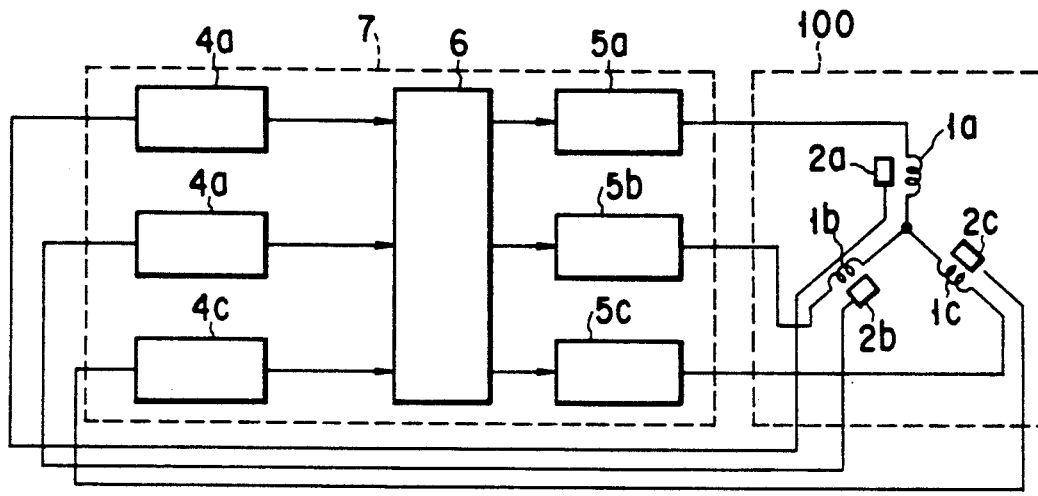
FIG. 33 is a schematic block diagram showing the arrangement of a conventional controller.
Figure 35A:
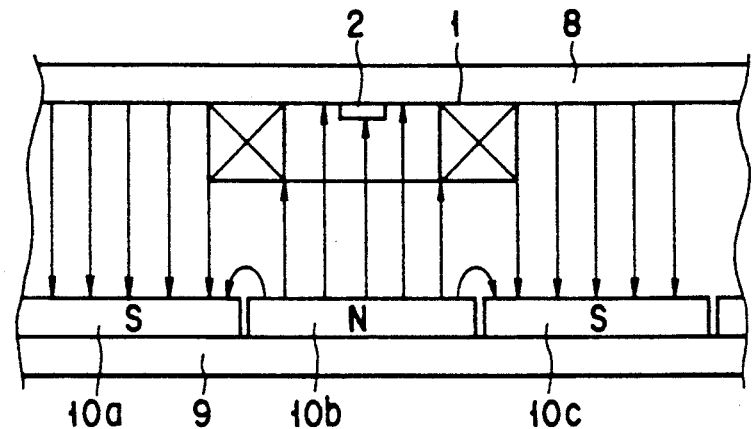
FIG. 35A is a view showing the position of the Hall element, at which the Hall element is properly operated while the motor is driven.
Figure 35B:
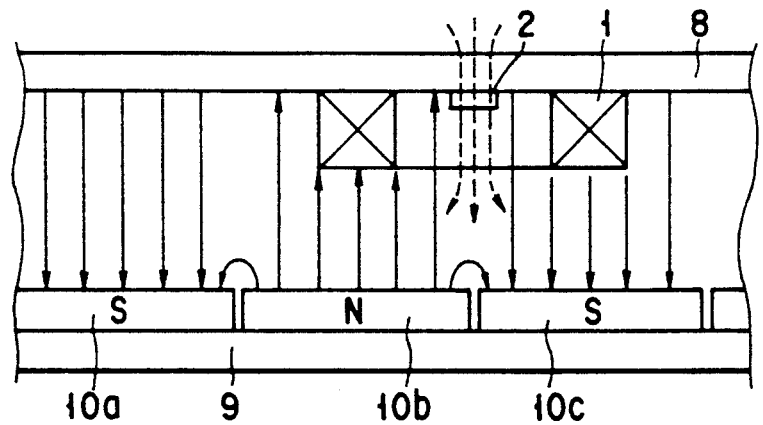
FIG. 35B is a view showing the position of the Hall element, at which the Hall element is erroneously operated while the motor is driven.
Figure 36:
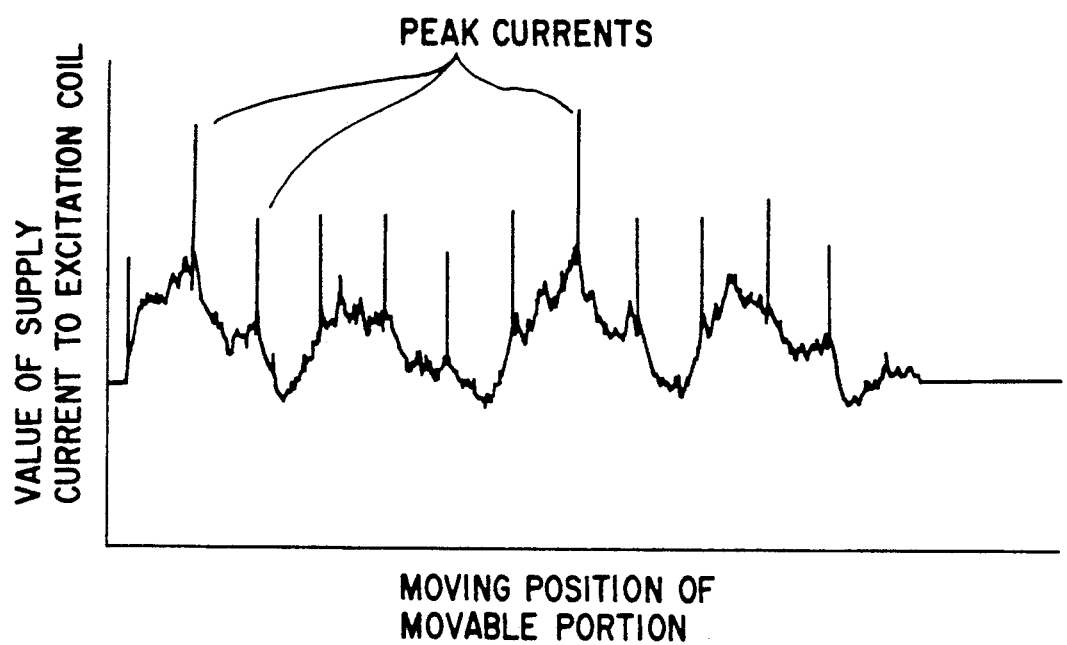
FIG. 36 is a graph showing the relationship between the moving position of a movable portion and the value of a current supplied to an excitation coil in a state wherein the motor is driven in the arrangement of the conventional controller.

As especially shown in FIG. 31, the microswitch 221 is electrically connected to a controller C2 and a CPU 237. The CPU 237 is designed to write speed, acceleration, and control constants and the like in the controller C2. The controller C2 performs a predetermined arithmetic operation for control on the basis of the respective constants output from the CPU 237 and a position signal from a linear encoder 101 mechanically coupled to a microscope stage 104, and outputs the operation result to the driver C3. The driver C3 is designed to drive a linear motor 100 by performing current amplification enough to drive the motor 100. The position detecting linear encoder 101 and the specimen holder having the microswitch 221 mounted near the hinge portion 219 are arranged on the microscope stage 104 driven by the linear motor 100. The microswitch 221 is designed to turn off the driver C3 when the pivot pawl 215 (see FIG. 28) is pivoted during replacement of the slide glass 203 (see FIG. 28). When the pivot pawl 215 (see FIG. 28) is pivoted, the supply of drive currents to the coils through the driver C3 electrically connected to the microswitch 221 is immediately stopped. In addition, the microswitch 221 is electrically connected to the CPU 237 so that the operating state of the microswitch 221 can always be monitored. With this arrangement, when an operation and confirmation switch is depressed upon completion of replacement of the slide glass 203 (see FIG. 28), drive currents flow in the coils through the driver C3 again to restore the driver C3 to a normal electric state.

An operation of the microscope stage with the speciment holder of this embodiment will be described with reference to FIGS. 28 to 32.

When the slide glass 203 is to be held by the pivot pawl 215, the pivot pawl 215 is pivoted against the biasing force of the spring in the direction to separate from the microscope stage (i.e., the direction to separate from the first to third abutment pawls 209, 211, and 213). After the slide glass 203 is brought into contact with the first to third abutment pawls 209, 211, and 213, the pivot pawl 215 is released to be urged against the corner portion 203d of the slide glass 203. In this case, the projection 231 of the brake mechanism 225 is gripped to move the brake mechanism 225 in the direction in which the wedge-like groove 227 becomes shallower, thus engaging the brake bar 229 with the shallow portion of the wedge-like groove 227 with pressure. At this time, the pivot pawl 215 is fixed in position while pressing the corner portion 203d of the slide glass 203. As a result, the slide glass 203 is held between the pivot pawl 215 and the first to third abutment pawls 209, 211, and 213.

When the slide glass 203 is to be removed from the pivot pawl 215, the brake mechanism 225 is released first. More specifically, the brake bar 229 is moved such that the brake bar 229 engaged with the wedge-like groove 227 with pressure is separated from the shallow portion of the wedge-like groove 227. At this time, only the biasing force of the spring acts on the pivot pawl 215. The specimen holder knob 217 is then pressed to move the pivot pawl 215 in the direction to separate from the microscope stage (i.e., the direction in which the pivot pawl 215 is separated from the corner portion 203d of the slide glass 203). After the pivot pawl 215 is separated from the slide glass 203, the slide glass 203 is removed.

An operation of microswitch 221 during such replacement of the slide glass 203 will be described below with reference to FIGS. 31 and 32.

The microswitch 221 is designed to be turned on only when the slide glass 203 is accurately held by the pivot pawl 215. Such an operation will be described below in accordance with the flow chart shown in FIG. 32 with reference to FIG. 31.

When the microswitch 221 is turned off by operation of the above-described clutch means (i.e., the pivot pawl 215 does not hold the slide glass 203), the microswitch 221 transmits a command signal to the driver C3 to stop the supply of drive currents to the coils through the driver C3, thus stopping excitation of the linear motor 100.

While the excitation of the linear motor 100 is stopped, the operator replaces the slide glass 203 (see FIG. 28) at an arbitrary position of the microscope stage 104.

When the operator depresses the operation end confirmation switch (not shown) after the replacement of the slide glass 203 is completed, the CPU 237 prepares to output a predetermined signal to the controller C2 so as to move the microscope stage 104 (see FIG. 28) from the current position to the initial position. Note that if the operation end confirmation switch is not depressed, the microswitch 221 keeps stopping the supply of drive currents to the coils through the driver C3.

Upon reception of the predetermined signal from the CPU 237, the controller C2 drives the linear motor 100 through the driver C3 to move the microscope stage 104 (see FIG. 28) toward the initial position (in the Y direction).

When the microscope stage 104 (see FIG. 28) is to be restored to the initial position in this manner, the linear encoder 101 keeps monitoring the moving state of the stage 104 so as to smoothly move the stage 104 at an optimal speed.

The microscope stage with the specimen holder according to this embodiment is designed such that the controller C2 keeps monitoring the count value of the linear encoder even while no drive currents flow in the coils (i.e., the slide glass 203 is not held by the pivot pawl 215). When the microscope stage 104 (see FIG. 28) is to be restored to the initial position, the operation end confirmation switch (not shown) is depressed to smoothly move the stage 104 at an optimal speed.

In addition, the specimen holder is also designed to be moved in the X direction of the microscope stage 104 by the linear motor 100.

As has been described above, the microscope stage with the specimen holder having the above-described arrangement allows high-precision positioning of the slide glass 203 without causing a deterioration in operability, unlike the prior art using a stepping motor and a feed screw or a rack and a pinion. In addition, since drive currents flow only when the pivot pawl 215 holds the slide glass 203, high reliability can be ensured without causing heat loss of the coils due to overcurrents through the driver C3, demagnetization of the magnets, and the like. Moreover, the incorporation of the brake mechanism prevents a relative positional shift between the specimen holder and the slide glass, thus allowing high-precision positioning.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A driving device for a multipolar type linear DC motor using a PWM driving signal, for driving a linear DC motor by causing an excitation coil of said motor, placed in alternating fields, to generate an induction field, and by switching polarities of the induction field, said driving device comprising:

magnetic polarity detecting means for detecting a direction of a magnetic field acting on said excitation coil in the alternating fields;

an electrical filter for removing an output signal output from said magnetic polarity detecting means and having the same period as a PWM drive period; and polarity switching control means for controlling a direction and generation time of an induction field generated by said excitation coil in accordance with an output signal from said magnetic polarity detecting means.

2. A driving device for a multipolar type linear DC motor using a PWM driving signal, for driving a linear DC motor by causing an excitation coil of said motor, placed in alternating fields, to generate an induction field, and by switching polarities of the induction field, said driving device comprising:

magnetic field strength detecting means for detecting a strength of a magnetic field acting on said excitation coil in the alternating fields;

magnetic field discriminating means, including a hysteresis circuit, for discriminating the magnetic field acting on said excitation coil on the basis of a potential of an output signal from said magnetic field strength detecting means by using hysteresis characteristics of said hysteresis circuit; and polarity switching control means for controlling a direction and generation time of an induction field generated by said excitation coil in accordance with an output signal from said magnetic field discriminating means.

3. A device according to claim 1, further comprising:

an incremental encoder means for detecting a state of said motor and for outputting a state detection signal representing the detected state;

a PID operation section for generating a control signal by sampling a deviation between the state detection signal and a target value for a predetermined sampling time;

means for controlling said motor by supplying the control signal, generated by said PID operation section, to said motor; and means for changing the sampling time for sampling/supplying the deviation to a differential operation system of said PID operation section, and for calculating a speed of said motor by a differential operation, in accordance with a driving speed.

4. A device comprising:

a linear DC motor, having an excitation coil, and a Hall element arranged in said coil, for moving a movable stage;

a linear encoder for detecting a speed of movement of said movable stage;

speed control means, connected to an output terminal of said Hall element, for driving said motor by switching polarities of a magnetic field in said motor;

position control means, connected to an output terminal of said linear encoder, for controlling a position of said movable stage;

driving control means, connected to output terminals of said speed control means and said position control means, for driving said motor while performing position and speed control of said movable stage on the basis of outputs from said speed control means and position control means; and means for preventing generation of a peak current when a direction of a supply current to said excitation coil of said motor is switched.

5. A device according to claim 1, wherein said electric filter comprises a flip-flop circuit.

6. A device according to claim 5, wherein said flip-flop circuit comprises a J-K flip-flop circuit.

7. A device according to claim 1, wherein said electric filter comprises a pulse generating circuit for limiting a frequency band so as to eliminate PWM waveforms.

8. A device according to claim 2, wherein said magnetic field discriminating means comprises a hysteresis control circuit.

9. A driving device for a multipolar type linear DC motor using a PWM driving signal, for driving a linear DC motor by causing an excitation coil of said motor, placed in alternating fields, to generate an induction field, and by switching polarities of the induction field, said driving device comprising:

magnetic polarity detecting means for detecting a direction of a magnetic field acting on said excitation coil in the alternating fields;

an electrical filter for removing an output signal output from said magnetic polarity detecting means and having the same period as a PWM drive period;

polarity switching control means for controlling a direction and generation time of an induction field generated by said excitation coil in accordance with an output signal from said magnetic polarity detecting means;

a PWM wave generator for generating a PWM wave in accordance with the PWM driving signal;

a power MOS field-effect transistor for switching driving and stopping states of said linear DC motor in accordance with a gate drive pulse input to a gate thereof;

a gate resistor, coupled between said PWM wave generator and said gate, for converting the PWM wave into the gate drive pulse; and means for compensating the PWM driving signal to compensate a difference between an effective time of the PWM wave and an effective time of the gate drive pulse.

10. A device comprising:

a linear DC motor, having an excitation coil, and a Hall element arranged in said coil, for moving a movable stage;

a linear encoder for detecting a speed of movement of said movable stage;

speed control means, connected to an output terminal of said Hall element, for driving said motor by switching polarities of a magnetic field in said motor;

position control means, connected to an output terminal of said linear encoder, for controlling a position of said movable stage;

driving control means, connected to output terminals of said speed control means and said position control means, for driving said motor while performing position and speed control of said movable stage on the basis of outputs from said speed control means and position control means;

means for preventing generation of a peak current when a direction of a supply current to said excitation coil is switched;

change-over switch means for turning on and off said motor; and means for manually moving said movable stage when said motor is turned off by said change-over switch means.

11. A device according to claim 10, further comprising a touch switch mounted on a manual operating section of said movable stage, said touch switch being coupled to said change-over switch means such that when one of said touch switch and change-over switch means is operated, said linear DC motor is turned off.

12. A device according to claim 10, wherein said means for manually moving said movable stage comprises:

a friction member mounted on said movable stage;

a friction wheel selectively engageable with said friction member; and an engagement switch means operatively coupled to said change-over switch means, for selectively controlling engagement between said friction member and said friction wheel; and wherein when said change-over switch means for turning on and off said linear DC motor is turned on, said engagement switch means is operated to permit said friction member and said friction wheel to be disengaged from each other.

13. A device according to claim 10, further comprising a specimen holder means for holding a specimen on said movable stage, said specimen holder means being coupled to said linear DC motor such that when said specimen holder means is not holding a specimen, said linear DC motor is turned off.

14. A device according to claim 13, wherein said specimen holder means comprises a pivot pawl movable between a first position for holding a specimen and a second position for engaging a clutch means coupled to said linear DC motor for turning said linear DC motor off.

* * * * *